US011195315B2

(12) United States Patent
Jones et al.

(10) Patent No.: US 11,195,315 B2
(45) Date of Patent: Dec. 7, 2021

(54) LANGUAGE ELEMENT VISION AUGMENTATION METHODS AND DEVICES

(71) Applicant: eSight Corp., Ottawa (CA)

(72) Inventors: Frank Jones, Carp (CA); James Benson Bacque, Ottawa (CA)

(73) Assignee: eSight Corp., Ottawa (CA)

( * ) Notice: Subject to any disclaimer, the term of this patent is extended or adjusted under 35 U.S.C. 154(b) by 0 days.

(21) Appl. No.: 16/749,187

(22) Filed: Jan. 22, 2020

(65) Prior Publication Data
US 2020/0160578 A1 May 21, 2020

Related U.S. Application Data

(63) Continuation of application No. 16/143,919, filed on Sep. 27, 2018, now Pat. No. 10,565,766, which is a
(Continued)

(51) Int. Cl.
G06T 11/60 (2006.01)
G06K 9/32 (2006.01)
G06K 9/20 (2006.01)
G06K 9/18 (2006.01)
G09G 5/34 (2006.01)
(Continued)

(52) U.S. Cl.
CPC ............... *G06T 11/60* (2013.01); *G06F 3/14* (2013.01); *G06F 40/106* (2020.01); *G06F 40/109* (2020.01); *G06F 40/58* (2020.01); *G06K 9/00604* (2013.01); *G06K 9/00671* (2013.01); *G06K 9/18* (2013.01); *G06K 9/2081* (2013.01); *G06K 9/325* (2013.01); *G06K 9/4604* (2013.01); *G06K 9/4652* (2013.01); *G06T 7/11* (2017.01); *G09G 5/00* (2013.01); *G09G 5/02* (2013.01); *G09G 5/34* (2013.01); *G02B 27/017* (2013.01); *G02B 2027/014* (2013.01); *G02B 2027/0138* (2013.01); *G06T 2207/10004* (2013.01); *G09G 5/26* (2013.01); *G09G 2320/066* (2013.01); *G09G 2340/045* (2013.01);
(Continued)

(58) Field of Classification Search
CPC .................................. G06T 11/60; G06T 7/11
USPC ........................................................ 345/633
See application file for complete search history.

(56) References Cited

U.S. PATENT DOCUMENTS

2015/0339536 A1* 11/2015 Lin ........................ G06K 9/228
  382/182
2017/0200296 A1* 7/2017 Jones ....................... G06F 40/58
2020/0111259 A1* 4/2020 Sears ....................... G06F 3/012

* cited by examiner

Primary Examiner — Thomas J Lett
(74) Attorney, Agent, or Firm — Rosenberg, Klein & Lee

(57) ABSTRACT

Near-to-eye displays support a range of applications from helping users with low vision through augmenting a real world view to displaying virtual environments. The images displayed may contain text to be read by the user. It would be beneficial to provide users with text enhancements to improve its readability and legibility, as measured through improved reading speed and/or comprehension. Such enhancements can provide benefits to both visually impaired and non-visually impaired users where legibility may be reduced by external factors as well as by visual dysfunction(s) of the user. Methodologies and system enhancements that augment text to be viewed by an individual, whatever the source of the image, are provided in order to aid the individual in poor viewing conditions and/or to overcome physiological or psychological visual defects affecting the individual or to simply improve the quality of the reading experience for the user.

21 Claims, 22 Drawing Sheets

Related U.S. Application Data continuation of application No. 15/404,700, filed on Jan. 12, 2017, now Pat. No. 10,127,706.

(60) Provisional application No. 62/277,510, filed on Jan. 12, 2016.

(51) Int. Cl.
| | |
|---|---|
| *G06K 9/00* | (2006.01) |
| *G06K 9/46* | (2006.01) |
| *G06F 3/14* | (2006.01) |
| *G09G 5/02* | (2006.01) |
| *G09G 5/00* | (2006.01) |
| *G06F 40/58* | (2020.01) |
| *G06F 40/106* | (2020.01) |
| *G06F 40/109* | (2020.01) |
| *G06T 7/11* | (2017.01) |
| G02B 27/01 | (2006.01) |
| G09G 5/26 | (2006.01) |

(52) U.S. Cl.
CPC . *G09G 2340/0464* (2013.01); *G09G 2340/12* (2013.01); *G09G 2340/14* (2013.01); *G09G 2354/00* (2013.01)

LANGUAGE ELEMENT VISION AUGMENTATION METHODS AND DEVICES

CROSS-REFERENCE TO RELATED APPLICATIONS

This application claims the benefit of priority as a continuation patent application from U.S. patent application Ser. No. 16/143,919 filed Sep. 27, 2018 entitled "Language Element Vision Augmentation Methods and Devices" which itself claims priority as a continuation patent application from U.S. patent application Ser. No. 15/404,700 filed Jan. 12, 2017 entitled "Language Element Vision Augmentation Methods and Devices" which itself claims priority from U.S. Provisional Patent Application 62/277,510 filed Jan. 12, 2016 entitled "Language Element Vision Augmentation Methods and Devices", the entire contents of which are included by reference.

FIELD OF THE INVENTION

This invention relates to near-to-eye systems and more particularly to methods and systems for enhancing textual based content displayed on the near-to-eye systems.

BACKGROUND OF THE INVENTION

A near-to-eye (or near-eye, NR2I) display is a wearable device that creates a display in front of the user's field of vision. The display may be transparent or opaque, depending on the application. For example, a transparent display can overlay information and graphics on top on the real world, while an opaque display can provide an immersive theater-like experience.

Near-to-Eye displays can be broadly placed in two categories, immersive and see-through. Immersive near-to-eye displays block a user's view of the real world and create a large field of view image, typically 30°-60° degrees for cinema glasses and 90°+ degrees for virtual reality displays. See-through near-to-eye displays leave the user's view of the real world open and create either a transparent image or a very small opaque image that blocks only a small portion of the user's field of view. The see-through category can be broken down into two applications, augmented reality and smart glasses. Augmented reality headsets typically offer 20°-60° degree fields of view and overlay information and graphics on top of the user's view of the real world. Smart glasses, in contrast typically have a smaller field of view and a display at which the user glances periodically rather than looking through the display continuously.

It is often the case that images displayed by NR2Is contain text which is to be read by the user. It would be beneficial for users of such near-to-eye displays to have a means provided for enhancement of the presented text in order to improve its readability and legibility, as measured through improved reading speed and comprehension. Such enhancement can provide benefits both in the case of visually impaired users and non-visually impaired user where legibility is reduced by external factors (for example fog, glare, low-light conditions, etc.). It would be beneficial for both static images and real- and non-real-time video images to be processed by the near-to-eye displays when they contain text. In other instances, where text may in fact be legible without enhancement, the implementation of text enhancements may allow for faster reading speeds, greater information retention or improvement in other reading-quality metrics, such as minimization of fatigue.

It would be further beneficial for such enhancements to be compatible with the evolving low weight, low volume, low complexity, and low cost near-to-eye display systems and be thus provided to users, both with normal vision or with low-vision. Accordingly, the inventors have established methodologies and system enhancements that augment an image containing text to be viewed by an individual, whatever the source of the image, in order to aid the individual in poor viewing conditions and/or to overcome physiological or psychological visual defects affecting the individual or to simply improve the quality of the reading experience for the user.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to near-to-eye systems and more particularly to methods and systems for enhancing textual based content displayed on the near-to-eye systems.

In accordance with an embodiment of the invention there is provided a near-to-eye (NR2I) system providing improved legibility of text within an image to a user based upon a process comprising the steps of:
acquiring an original image;
processing the original image to establish a region of a plurality of regions, each region having a probability of character based content exceeding a threshold probability;
determining whether the region of the plurality of regions is relevant to the user; and
upon a positive determination:
  processing the region of the plurality of regions to extract character based content;
  processing the extracted character based content in dependence upon an aspect of the user of the NR2I system to generate a modified region; and
  displaying the modified region in combination with the original image.

In accordance with an embodiment of the invention there is provided a method comprising:
acquiring an original image for presentation to a user by a display system, the image established by at least one of acquisition with a camera local to the user, reception of the image from a remote server on a network to which the display system is directly connected or indirectly connected, retrieving the image from an electronic device connected via a wired connection or a wireless connectional to the display, and synthesis of the image from content established from a source or a plurality of sources;
identifying regions within the image that have a likelihood of containing character based content above a predetermined likelihood, such identification being either static or dynamically determined based on at least one of image content, meta-data of the image, user input, user preferences, user context, and a vision characteristic of the user;
generating enhanced text areas by applying an image processing algorithm of a plurality of image processing algorithms to the regions identified for the specific purpose of enhancing readability, such image processing algorithm differing substantially from any processing which may be applied to non-text regions;
creating a composite image consisting of the enhanced text areas and the original image;

presenting the composite image upon a display for presentation to the forming part of the display system.

In accordance with an embodiment of the invention there is provided a method comprising:

acquiring an original image for presentation to a user by a display system, the image established by at least one of acquisition with a camera local to the user, reception of the image from a remote server on a network to which the display system is directly connected or indirectly connected, retrieving the image from an electronic device connected via a wired connection or a wireless connectional to the display, and synthesis from content established from a source or a plurality of sources;

processing the original image to identify regions having a likelihood of containing character based content above a likelihood threshold;

processing those regions exceeding the likelihood threshold to extract their character based content;

processing the extracted character based content to generate modified extracted content having improve readability by the user in dependence upon data relating to the user's vision; and displaying the content to the user upon the display system in a predetermined format and predetermined location wherein, the predetermined location is established in dependence upon at least one of the data relating to the user's vision, a user preference, the region from which the extracted character based content forming the basis of the modified extracted content was extracted from, an established region of interest of the user, and a region of the display system based upon the gaze direction and head orientation of the user; and the predetermined format is at least one of a table of modified extracted content, a ribbon of modified extracted content, and an overlay with the modified extracted content in the location of the region from which the extracted character based content forming the basis of the modified extracted content was extracted.

In accordance with an embodiment of the invention there is provided a near-to-eye (NR2I) system providing improved legibility of character based content to a user based upon a process comprising the steps of:

obtaining electronic content for presentation to the user;

processing the obtained electronic content to establish a portion of the obtained electronic content containing character based content;

processing the portion of the obtained electronic content containing character based content to at least one of:

enhance the portion of the obtained electronic content containing character based content and present the enhanced portion of the obtained electronic content containing character based content to the user;

detect character based content within the portion of the obtained electronic content containing character based content and replace it with replacement character based content having at least one of improved legibility, enhanced readability and enhanced comprehension to the user;

detect character based content within the portion of the obtained electronic content containing character based content and present it to the user in a non-text based format.

In accordance with an embodiment of the invention there is provided a near-to-eye (NR2I) system providing improved legibility of character based content to a user based upon a process comprising the steps of:

establishing an image for presentation to a user on a NR2I system, the image established by at least one of acquisition with a camera local to the user, reception of the image from a remote server on a network to which the NR2I system is directly connected or indirectly connected, retrieving the image from an electronic device connected via a wired connection or a wireless connection to the NR2I, and synthesis of the image from content established from a plurality of sources;

identifying at least a region of a plurality of regions, each region being within the image and containing character based content where such identification is either static or dynamically determined based on at least one of image content, meta-data of the image, user input, user preferences, and a vision characteristic of the user;

applying an optical character recognition algorithm to the region to generate recognized character based content;

establishing a replacement region in dependence upon the region and the plurality of regions and the recognized character based content by at least one of translating the recognized character based content to a preferred language of the user and establishing at least one of a font, a font size, a foreground colour scheme, a background colour scheme and a font effect to employ in rendering either the recognized character based content or translated text as part of the replacement region;

generating a display image for rendering to the user comprising the image for presentation and the replacement region.

In accordance with an embodiment of the invention there is provided a method comprising:

presenting character based content to a user within a predetermined form within a predetermined format;

varying a predetermined characteristic relating to either the predetermined format and the form of presenting the character based content;

receiving user feedback when the variation of the predetermined characteristic crosses a threshold from an ease of comprehension to a difficulty of comprehension or vice-versa;

storing the value at which the user provides feedback and employing this as a limiting value in subsequently presenting modified extracted character based content to the user within a display system.

In accordance with an embodiment of the invention there is provided a method of displaying text content on a display to a user, in which the text is automatically scrolled within a text-window, wherein the text scrolling-rate is determined in dependence upon the user's current reading locus as determined from measured gaze-direction in combination with the user's preferred-retinal-locus offset, wherein one of inter-line spacing and text font size are selected in dependence upon the current scroll-speed.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1A:
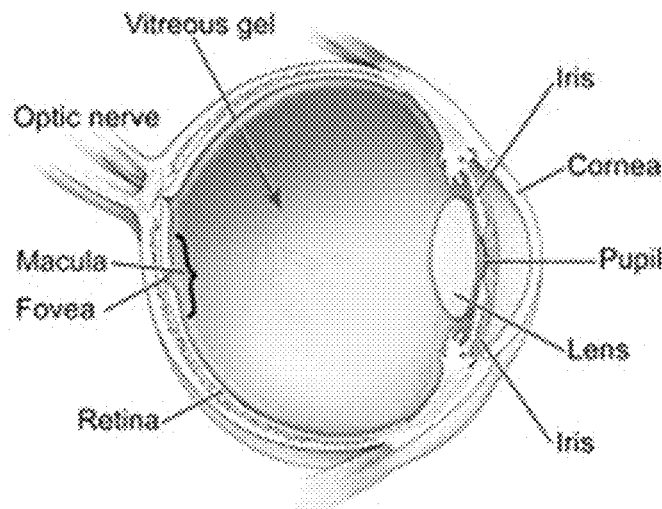
FIG. 1A depicts is a diagram of the eye.

The present invention relates to near-to-eye systems and more particularly to methods and systems for enhancing textual based content displayed on the near-to-eye systems.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes, but is not limited to, such devices as a cellular telephone, smartphone, personal digital assistant (PDA), portable computer, pager, portable multimedia player, portable gaming console, laptop computer, tablet computer, a digital camera, a digital videorecorder, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, an installed digital camera or digital videorecorder (for example within a kiosk, an automatic teller machine, or mounted to infrastructure for surveillance), and a multimedia player.

A "near-to-eye device" (simply referred to as NR2I) as used herein, and throughout this disclosure refers to an element of a device, a portion of a device, or a device which is positioned close to the user s eye or eyes. Accordingly, "NR2I" may refer to devices that incorporate an image presentation device operating in conjunction with a microprocessor such that a predetermined portion of an image is presented to the user on the image presentation device. In this instance the source of the image for display to the user of the NR2I may come from a remote image capturing device, a portable electronic device, a fixed electronic device or any video source including static and dynamic content acquired from a network. A NR2I may also refer to a wearable device comprising an image capture device in conjunction with an image presentation device although the image acquired from the image capture device may be augmented with content acquired by the NR2I from another source. A NR2I may include a microprocessor and any associated electronics including, but not limited to, memory, user input device, gaze tracking, context determination, graphics processor, and multimedia content generator may be integrated for example with the NR2I, form part of an overall assembly with the NR2I, form part of the PED, or as discrete unit wirelessly connected to the NR2I and/or PED. A NR2I may include but is not limited to, configurations that are immersive (i.e. the user only sees the display), peripheral (i.e. the user sees content from the NR2I with a portion of their viewing field, or transmissive wherein the user may view their normal field of view (real world view) and the NR2I overlays to that real world view (sometimes referred to as augmented reality).

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tool (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

"User information" as used herein may refer to, but is not limited to, user behavior information and/or user profile information. It may also include a user's biometric/biomedical information, an estimation of the user's biometric/biomedical information, or a projection/prediction of a user's biometric/biomedical information derived from current and/or historical biometric/biomedical information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, smart glasses, environmental sensors, medical sensors, biological sensors, physiological sensors, chemical sensors, ambient environment sensors, position sensors, and motion sensors.

"Biometric" or "biomedical" information as used herein may refer to, but is not limited to, data relating to a user characterised by data relating to a subset of conditions including, but not limited to, their eyesight, biological condition, physiological condition, ambient environment condition, position condition, neurological condition, drug condition, and one or more specific aspects of one or more of these said conditions.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wik/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, a user input, and a message for example.

A "wearer" or "user" as used herein and through this disclosure refers to, but is not limited to, a person or individual who uses the NR2I either as a patient requiring visual augmentation to fully or partially overcome a vision defect or as an ophthalmologist, optometrist, optician, or other vision care professional preparing a NR2I for use by a patient. A "vision defect" as used herein may refer to, but is not limited, a physical defect within one or more elements of a user's eye, a defect within the optic nerve of a user's eye, a defect within the nervous system of the user, a higher order brain processing function of the user's eye, and an ocular reflex of the user. A "wearer" or "user" may also be an individual with healthy vision, using the NR2I in an application other than for the purposes of ameliorating physical vision defects. Said applications could include, but are not necessarily limited to gaming, augmented reality, night vision, computer use, viewing movies, environment simulation, etc. Augmented reality applications may include, but are not limited to, medicine, visual assistance, engineering, aviation, tactical, gaming, sports, virtual reality, environment simulation, and data display.

An "aberration" or "optical aberration" as used herein and through this disclosure refers to, but is not limited to, a degradation and/or distortion imparted to an optical image by one or more optical elements individually or in combination such that the performance of the one or more optical elements individually or in combination departs from the performance predictions of paraxial optics. This includes, but is not limited to, monochromatic aberrations such as piston, tilt, defocus, spherical aberration, coma, astigmatism, field curvature, and image distortion. This includes, but is not limited to, chromatic dispersion, axial chromatic aberrations, and lateral chromatic aberrations.

"Text" as used herein and through this disclosure refers to, but is not limited to, any object that can be "read," whether this object is a work of literature, a street sign, an electronic message. It is a coherent set of signs/symbols that transmit some kind of informative message. This set of symbols is considered in terms of the informative message's content, rather than in terms of its physical form or the medium in which it is represented and hence may include, for example one or more alphabets including, for example, Latin, Greek, Arabic, Hebrew, Cyrillic, Kana, and Hanzi. It may also include any character notations from any human-readable language, including the languages and character sets of science, technology, mathematics, and music.

Reference to an "image", "visual element" or "audiovisual element" as used herein may refer to, but is not limited to, any machine-readable and machine-storable work product intended for consumption by and/or rendering to a user or users at least partially in a visual manner. An image may be a file, a combination of files, one or more files with embedded links to other files, etc. The files may be of any type, such as audio, image, video, multimedia, etc. Parts of an image to be rendered to an end user can be thought of as "content" of the image or audiovisual element. An audiovisual element may include "structured data" containing both content (music, video, etc.) and some indication of the meaning of that content, or "meta-data" (for example, properties and associated data, HTML, tags and associated data, etc.). Specific elements and/or links within the audiovisual element may be defined by embedded information or instructions pointing to locations internal or external to the document. In the context of the Internet, a common audiovisual element is an element accessible via a Web page. Web pages often include audiovisual elements and may include embedded information (such as meta information, hyperlinks, etc.) and/or embedded instructions (such as Javascript, etc.). In many cases, an audiovisual element has a unique, addressable, storage location and can therefore be uniquely identified by this addressable location such as a universal resource locator (URL) for example used as a unique address used to access information on the Internet.

In other instances, an image or audiovisual content may be a single item, e.g. a digital image, digital photograph, page of an electronic document, etc., or part of larger audiovisual content, e.g. digital video, digital multimedia content, a portable document (e.g. Adobe PDF), an electronic book (e.g. EPUB or IEC 62448) etc. Optionally, the image or audiovisual element is static whereas it may alternatively be dynamic. The image may be all of the audiovisual content or a selected/cropped portion of the audiovisual content displayed with or without magnification/minification.

"Context" as used herein and through this disclosure refers to, but is not limited to, data describing the circumstances and/or location of a user at a particular point in time and space when a decision is made by an application in execution upon a processing system as to how to process, acquire, store, and/or present information. Accordingly, the context may be employed both in deciding how to present information but also in the generation of the information or even whether to process any information at all. Accordingly, context may include data relating to physical location, date, time, ambient environment, user information, biometric information, etc. as well as data relating to an activity that has just occurred, is occurring or is about to occur. Context may include therefore an itinerary, an option relating to an activity or itinerary etc.

Referring to FIG. 1A there is depicted a schematic diagram of the human eye. Light enters the eye through the cornea to the lens wherein it is focused onto the retina which is covered in photoreceptors. The pupil adjusts the amount of light admitted and the portion of the retina responsible for fine detail vision is the macula. A wide range of visual issues or problems occur within the general population as a result of one or more defects within the eye or as the result of neurological issues in the connectivity of the optical nerve that channels the outputs of the photoreceptors to the visual cortex in the brain. For example, these may be related to the eyeball being too long/short or the lens too powerful/weak resulting in myopia or hyperopia. Alternatively, uneven corneal curvature leads to astigmatism whilst loss of flexibility in the lens results in presbyopia. Others may impact the central visual field such as age-related macular degeneration (AMD), optic neuropathy, Leber's optic atrophy, macular holes, cone dystrophies, Best's disease, Stargardt's disease and achromatopsia. Others may impact peripheral field loss such as glaucoma, retinal detachment, retinitis pigmentosa, and chorioretinitis.

Irrespective of the existence of a specific condition, the impact on vision is unique for each patient or user. In essence no one has perfect vision but for a portion of the population the degree of degradation may be low enough that the user is unaware of it, particularly with the ability of the human brain to process and manipulate the signals it receives. However, whilst this portion of the population may have no issues normally a variety of environmental factors may impact their vision such as a bright direct sunlight, low light levels, poor night vision, fog, etc. Accordingly, the inventors consider that an NR2I may provide augmented vision for users of all visual levels and that the particular visual characteristics of the user define the nature of visual field corrections, content augmentation etc. that is appropriate for that user.

Figure 1B:
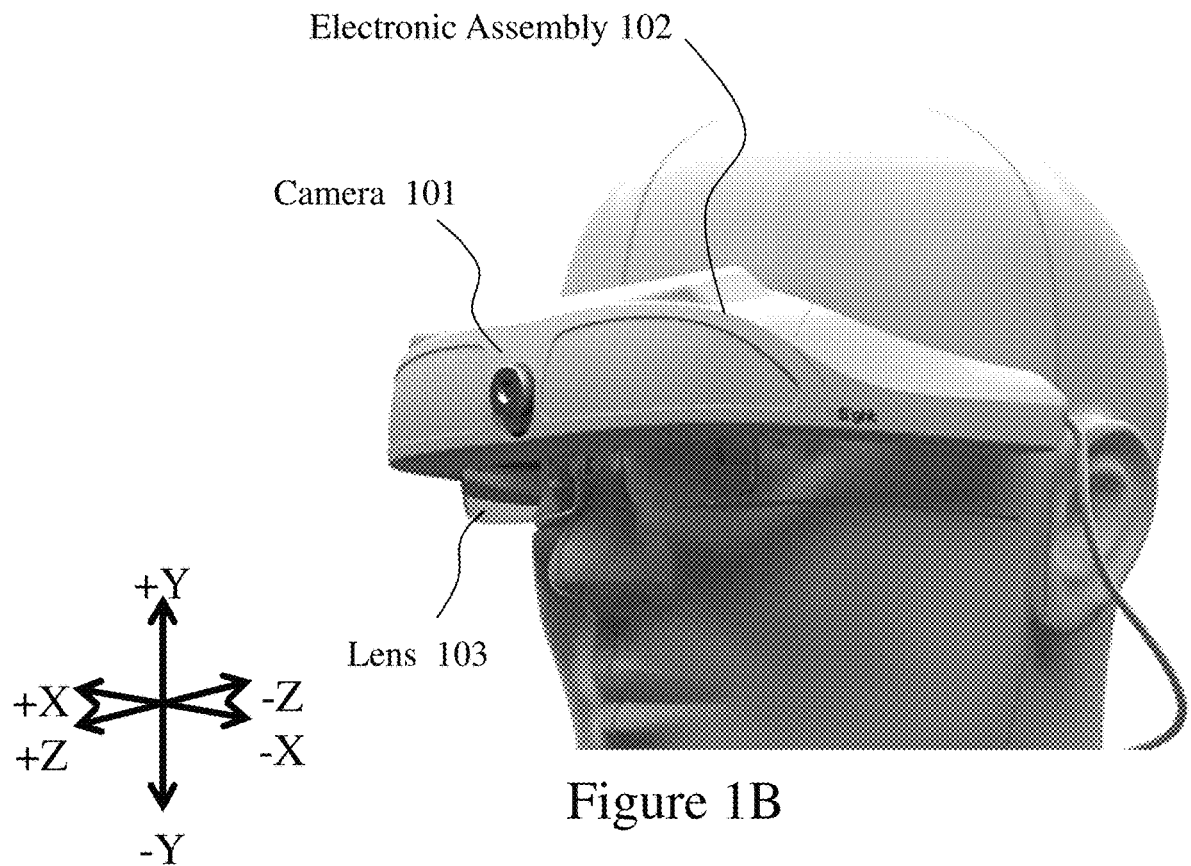
FIG. 1B depicts a reference frame for the three dimensions "X", "Y", and "Z" that are used to describe the relationship of the head worn display and camera system relative to the user.

Now referring to FIG. 1B there is depicted a reference frame for the three dimensions "X", "Y", and "Z" that are used to describe the relationship of the head worn display, comprising an Electronics Assembly 102 and Camera 101, and Lenses 103 relative to the user. The "X" dimension as shown indicates the position of the head worn system laterally across the left right dimension of the user's face. Generally, the "X" dimension values increase in a rightward direction relative to the user's perspective, and decreases in a leftward direction relative to the user's perspective. X=0 is considered to be the center of the user's nose. Similarly, the "Y" dimension values increase in an upward direction and decrease in a downward direction whilst "Z" dimension values increase in the direction moving away from the user's face, and decrease in the direction moving closer to the user.

Figure 1C:
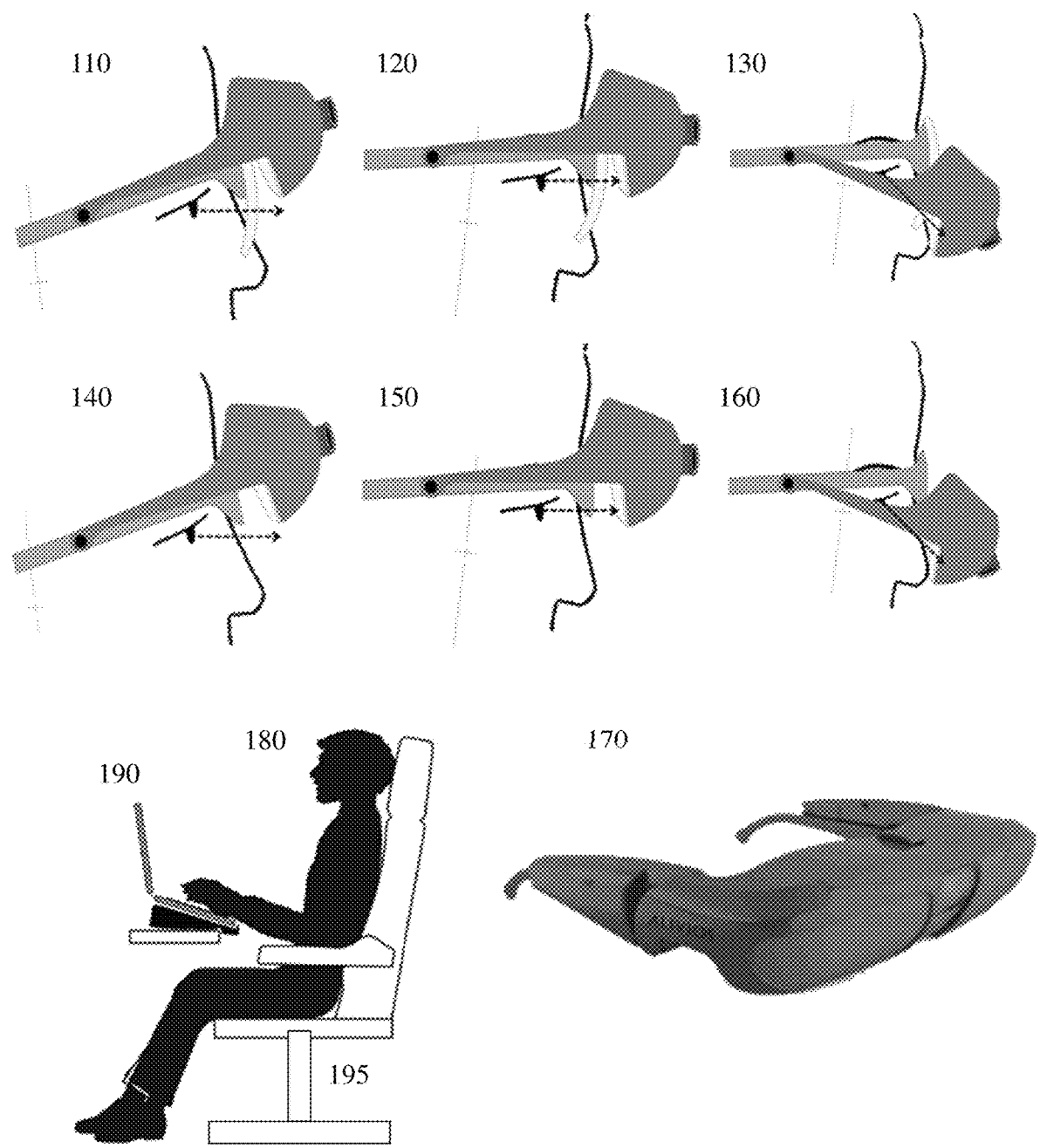
FIG. 1C depicts a bioptic head mounted near-to-eye (NR2I) head mounted display (NR2I) system supporting embodiments of the invention.

Referring to FIG. 1C there is depicted a NR2I, e.g. an eSight™ NR2I, that support embodiments of the invention for users with and without refractive correction lenses. There being shown by first to third schematics 110 to 130 respectively in the instance of corrective lenses and fourth to sixth schematics 140 to 160 respectively without such lenses. Accordingly, a user 180 working with a laptop computer 190 would typically be sitting with their head in orientations depicted in second, third, fifth, or sixth schematics 120, 130, 150 and 160 respectively wherein the NR2I is engaged. In this instance the laptop computer 190 may establish a direct WPAN or wired link to the NR2I 170 thereby displaying the images to the user which would otherwise be displayed on the screen of the laptop computer. In some instances, the laptop computer, due to typically increased processing resources compared to NR2I 170 or a PED to which the NR2I 170 is connected, may have software in execution thereon to take over some or all processing from the NR2I 170 or PED. If the user tilts their head backwards with a weighted NR2I bioptic system, then the NR2I pivots out of the way as depicted in first and third schematics 110 and 140 respectively. Optionally, the NR2I is manually pivoted out of the user's line of sight but they may still view the display by glancing upwards. In the third and sixth schematics 130 and 160 the user has tilted their head forward to view something wherein the camera within the NR2I may tilt and/or zoom to provide a different viewpoint.

Accordingly, in the different configurations the user may view the NR2I itself in different orientations either directly without refractive correction lenses or through different regions of their refractive correction lenses. Whilst NR2I 170 as depicted is immersive when employed in second, third, fifth, or sixth schematics 120, 130, 150 and 160 respectively it would be evident that in other embodiments the NR2I 170 may provide augmented vision wherein the user views through the NR2I 170 whilst having information and/or content overlaid to it or the NR2I 170 may be transmissive (with respect to the field of view (FOV)), opaque, or selectively transmissive and peripherally provide information to the user.

Figure 2A:
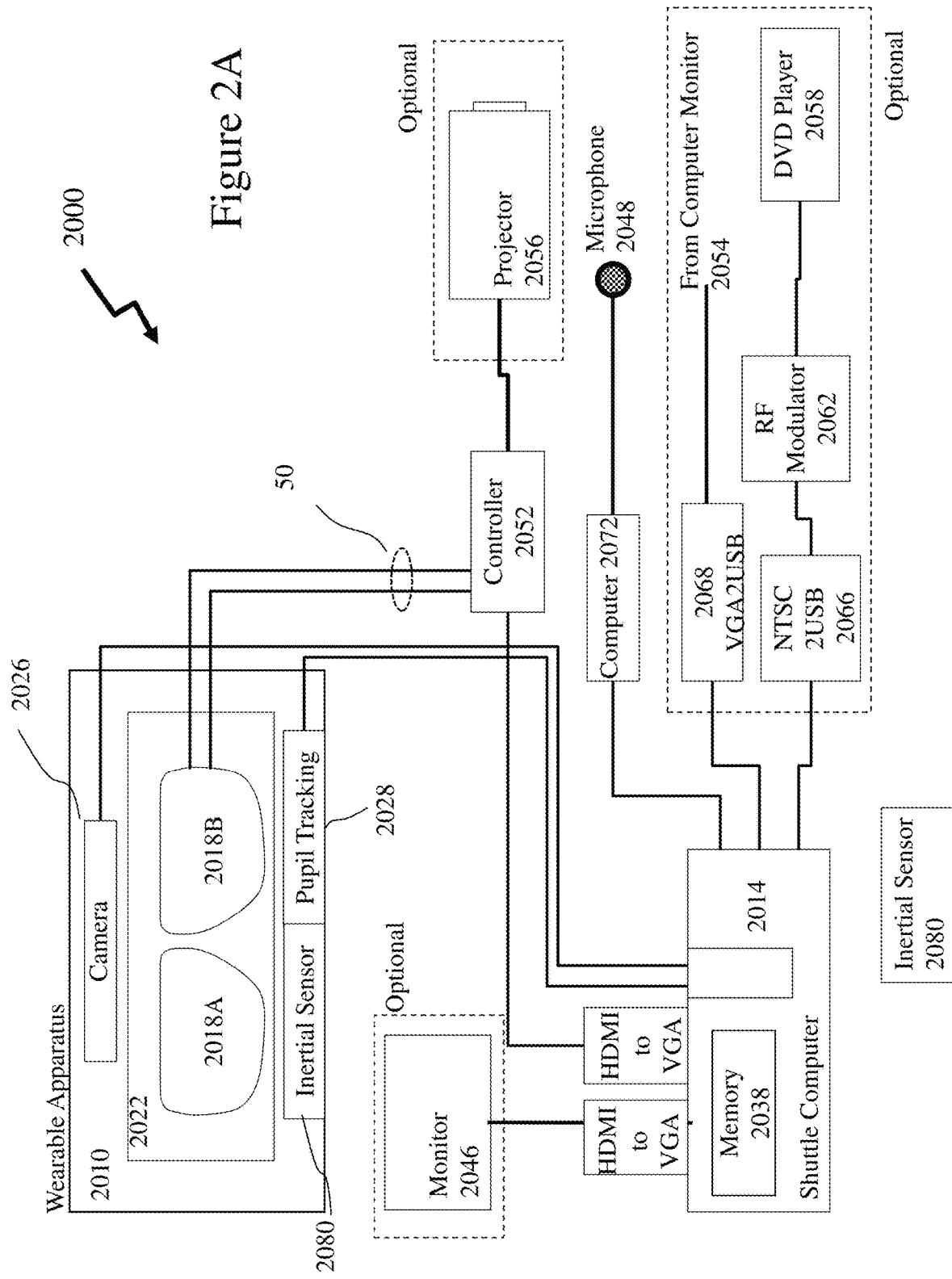
FIG. 2A depicts a schematic diagram of an NR2I supporting embodiments of the system of the invention.
Figure 18:
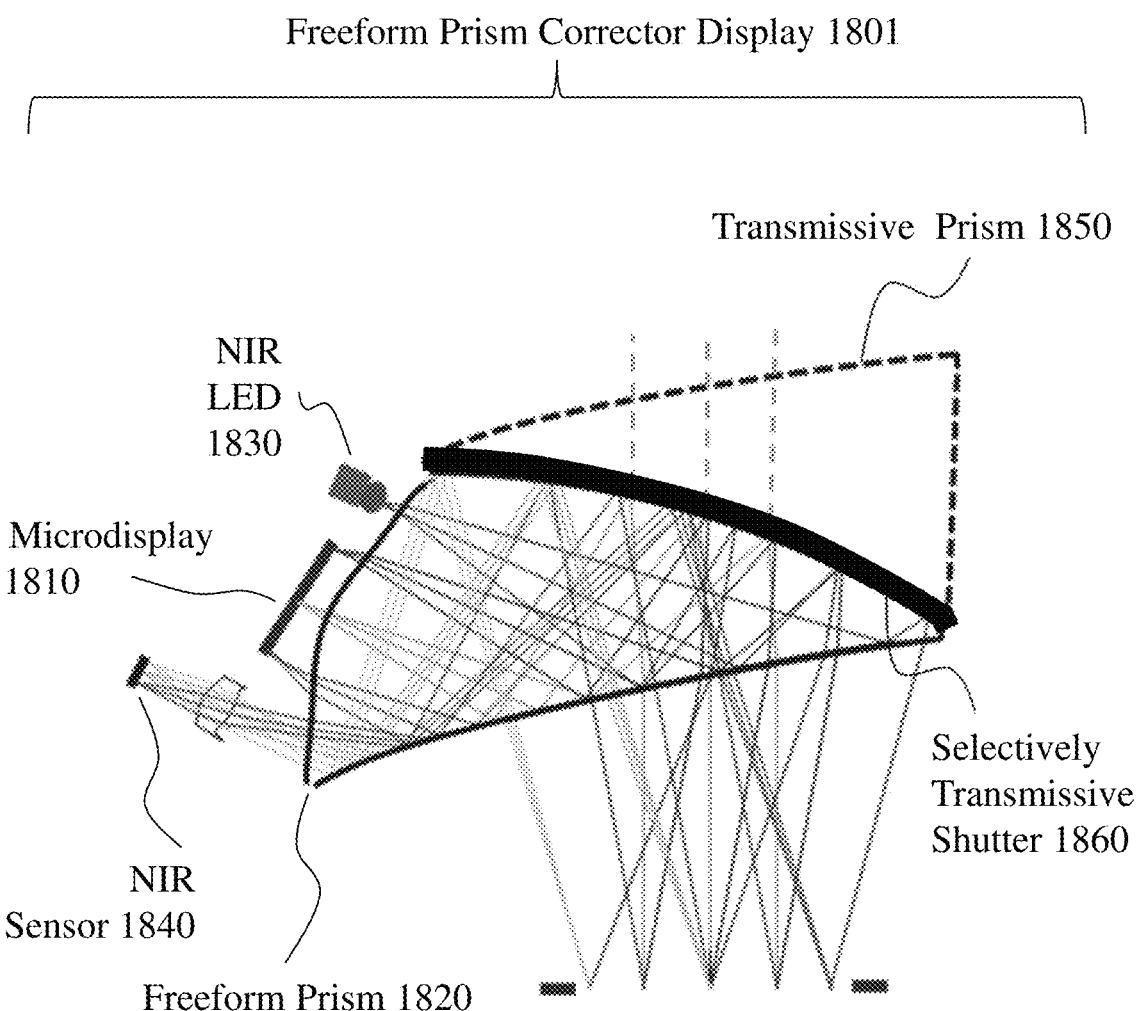
FIG. 18 depicts schematically an optical configuration for a NR2I system according to an embodiment of the invention providing an optical pipeline for coupling an optical display to the user's vision with optical eye tracking and supporting immersive or transmissive configurations.

Accordingly, the NR2I 170 may employ opaque, transmissive, or selectively/partially transmissive displays, the latter in which only a region of the display is made partially or completely opaque, so that the user may view the displayed ROI image within the region and the FOV outside that region through the transmissive portions. In some embodiments of the invention a controllable selectively transmissive display may be provided, such as for example exploiting a thin-film or liquid-crystal light-control element disposed within the optical pipeline at a predetermined point to allow "partial-mirroring" wherein the FOV and generated image, e.g. processed ROI or extracted content, are combined and directed towards the user's eye. Alternatively, an optical prism may be employed such as depicted in FIG. 18 to only provide coupling of the display generated image to the user's eye, e.g. with an opaque NR2I blocking the external FOV from the user's vision (i.e. immersive NR2I) or provide overlay of the display generated image to the user's FOV view (i.e. augmented vision). Referring to FIG. 2A there is depicted a system 2000 for augmenting sight of an individual supporting embodiments of the invention. Accordingly, a pair of eyeglass frames 2010 or head mounted display are depicted together with a processor 2014. In one embodiment, the processor 2014 is a general purpose microprocessor whereas in other embodiments the processor 2014 is an application specific integrated circuit (ASIC) or field programmable gate array (FPGA). The eyeglass frames 2010 are the typical eyeglass frames generally available and used today with transparent lenses. In this embodiment, the transparent lenses have been replaced with one or two display screens 2018A, 2018B (generally 2018). Attached to the frame are one or more image capture devices 2026, such as a camera. Optionally, one or more eye or pupil tracking sensors 2028 and associated electronics are also attached to the frame together with an inertial sensor 2080 for detecting motion, orientation, vibration, etc. The electronics provide for image capture by the image capture device and transmission to the processor 2014 by way of a wired or wireless link 2050. The processor 2014 includes one or more input output (I/O) modules and a memory 2038 in communication with each other by way of a bus as in standard computer design. The I/O modules not only receive images from the image capture device 2026, but transmit the modified images back to the eyeglass frames for display on one or both of the display screens 2018A, 2018B. With two or more image capture devices 2026, the resulting images may be displayed on a respective display 2018A, 2018B to provide depth perception (depending on the capture device position), or both displays may display content from a single image capture device and present either a selected region of interest (ROI) in the field of view (FOV), the FOV modified or unmodified with a modified or unmodified ROI, a modified or unmodified ROI. Optionally, dual image capture devices may be employed with one capturing an ROI within the FOV captured by the other image capture device wherein the ROI is displayed within one or both displays. In this way, for example, the second image capture device may capture a magnified region of interest (ROI) to enhance processing. Optionally, a single display may be employed. Optionally, a single camera with high speed zoom capabilities may provide capture of both the FOV and higher magnification ROI.

In more detail, in various embodiments, the displays 2018A, 2018B in the eyeglass frames 2010 include, in one embodiment, a thin film display such as a liquid crystal display. Embodiments may employ opaque, transmissive, or selectively transmissive displays, the latter in which only a region of the display is made partially or completely opaque, so that the user may view the displayed ROI image within the region, 2a or 2band the real world outside the region through the transmissive portions. In some embodiments allowing transmissive scene-viewing the controllable selectively-transmissive device, for example a thin-film or liquid-crystal light-control element might be disposed in the optical pipeline at a point of partial-mirroring, where FOV- and display-generated light combines and is directed towards the user's eye. In another embodiment, the displays use Liquid Crystal on Silicon (LCOS) technology. In a further embodiment, the displays use Organic Light Emitting Diode (OLED) technology. In still a further embodiment, the displays use micro-projection technology onto a reflective (partial or 100% reflective) glass lens or prism. In various embodiments, each display shows a different image or the same image. If the modified image is to be displayed only to one eye, only one display 2018A is required. The displays in various embodiments can incorporate refractive lenses similar to traditional eyeglasses, such that the display works in concert with a person's unique optical prescription.

Similarly, the image capture device 2026 in one embodiment is a charge coupled device (CCD) camera with high depth-of-field optics. In another embodiment, the image capture device is a Complementary Metal Oxide Semiconductor (CMOS) image sensor with appropriate optics. In other various embodiments, the image capture device is any imaging device with an analog or digital signal output that can be sent to a processing unit 2014 for processing. In a binocular configuration, each image capture device or camera 2026 sees a slightly different image, thereby providing stereoscopic vision to the viewer. If the image is to be presented to only one eye, then only one image capture device or camera 2026 is needed to record the image for that eye. Although in the embodiment shown the image capture device or camera 2026 and related electronics are mounted on the eyeglass frame 2022, it is contemplated that the camera 2026 and electronics could also be located elsewhere on the individual's person. Also, although two cameras 2026 are contemplated for binocular vision, it is possible for one camera 2026 to view the image and present the same image to both displays 2018A. In addition, in various other embodiments the source of the image may be another camera, a television, a computer 2054 or other source 58 capable of supplying an input to the processor 2014.

The optional eye tracking sensor 2028 is also in communication with the electronics and determines where in the visual field the individual is looking. In one embodiment, this sensor 2028 operates by following the position of the pupil. Such eye tracking devices 28 are common in presently available "heads-up-displays" utilized by military pilots. Again, although an embodiment contemplated includes two tracking sensors 2028, because both eyes typically track together, one tracking device may be used. In another embodiment, the eye tracking sensor uses a combination of mirrors and prisms such that the optical path for the eye tracking sensor is orthogonal to the pupil. Eye tracking is used to determine the preferred retinal locus (PRL) and region of interest (ROI) within an image, and to ensure that the damaged areas of a person's vision are avoided when the modified image is presented to the eye. Whilst within "normal" vision the user's preferred retinal location (PRL) and the ROI location are essentially coincident such that gaze tracking/pupil tracking allows determination of the ROI/PRL this is not true for all users. In some visual dysfunctions the PRL and ROL are displaced from one another and these may one or other may be coincident or displaced from the eye's physical orientation as determined, for example, by pupil-tracking. Accordingly, the NR2I system should establish during initial user configuration the correlation between the user's gaze tracking/pupil tracking and their PRL/ROI. In this manner, without an adjustment in the camera position the acquired image which is essentially aligned to the user's "central line of sight" where their eyes point directly ahead can be offset to account for the user's ROI/PRL offset.

The eye-tracking information is suitably averaged and dampened in software to minimize the sensitivity to random eye movements, blinks, etc., and to optimize the system for various usage models. For example, reading English requires specific eye tracking performance in the left to right direction different from that in the right to left direction, and different again from that in the vertical direction. Similarly, the inertial sensor 2080 can be employed to provide orientation, direction, and location information relating to the user.

Images from the image capture device 2026, eye position information from the eye tracking sensor 2028, inertial sensor 2080 and images destined for the displays 2018A are passed through the appropriate I/O modules of the processor 2014. In the embodiment shown, the display 2018 is controlled by a controller 2052 by the same manufacturer as display 2018 although these may be different. This communication between the processor 2014 and the electronics of the eyeglass frames 2010 may be transmitted through a wired connection 2050 or be transmitted wirelessly. Certain functions, such as magnification, may be performed in an analog manner, such as by adjusting the lens array on the camera or digitally by mathematically processing pixels.

In the embodiment shown, the processor 2014 is a Shuttle computer having memory 2038 and I/O modules'. The I/O modules not only communicate with the eyeglass frames 2010 but also with other displays and input devices. For example, the processor 2014 may be connected to a second optional monitor 2046, so that a health care provider or device technician can see what the user is seeing. In addition, the controller 2052 is capable of providing video data to a projector 2056. In this way, greater numbers of individuals may see what the user is seeing.

Additionally, display images from a computer 2054 and from a video source 58 such as a DVD may provide images for display on the display of the eyeglass frames 2010. Such images may be used to help train the user to diagnose hardware and software failures and to help diagnose and treat the patient. In one embodiment, an input device such as a DVD player 58 provides a signal to an RF modulator 2062 which then passes the RF image signal to the processor 2014 through a Win TV NTSC to USB module 2066. This signal enters the processor 2014 through a connector. Similarly, image data from a computer monitor 2054 may also be displayed on the glasses 2010 by converting the signal from the monitor 2054 using a HDMI to USB converter 2068. Additionally, the user may wear a ring-like "text-camera" on his or her finger which he or she then scans over a line of text. Such devices reduce the optical complexity of the eyeglass camera 2026. Finally, in this embodiment, input commands may be entered by way of a microphone 2048 in communication with a computer 2072.

The processor 2014 in another embodiment is a processing device having cellular telephone capabilities or a software modified cellular telephone. In this embodiment data, for example from an ophthalmologist or other health care professional 46, may be received from the cellular telephone network and verbal control instructions from the individual 48 may be input through the phone's microphone or alternatively may be keyed in through the phone's touchpad or movement sensor. In other embodiments, the processor 2014 is a specialized computer or handheld device.

Received data and control instructions are then stored in memory 2038. The memory 2038 includes random access memory (RAM) for data storage and program execution, and read only memory (ROM) for program storage. The processor 2014 accesses the data in memory and manipulates it in response to the control instructions for transmission back to the eyeglass frames 2010 for display. In this way, the individual can tailor the displayed image for optimal viewing.

Figure 2B:
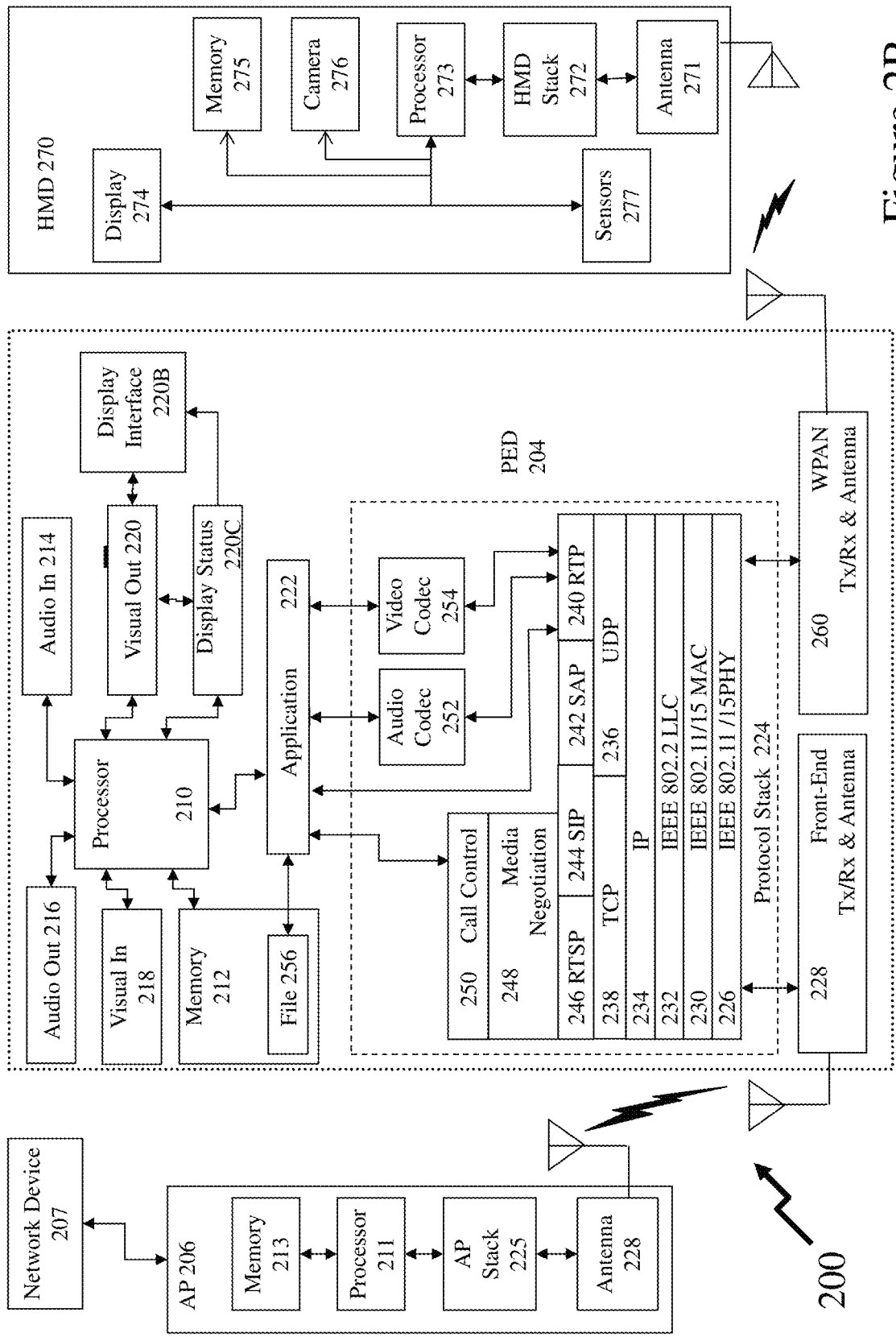
FIG. 2B depicts the structure of an NR2I controller supporting embodiments of the invention wirelessly interfaced to a user's portable electronic device (PED) which is interfaced via wireless and wired networks to the Internet.

Now referring to FIG. 2B there is depicted a portable electronic device 204 supporting an interface to a NR2I 270 according to an embodiment of the invention within a system 200. Also depicted within the PED 204 is the protocol architecture as part of a simplified functional diagram of a system 200 that includes a portable electronic device (PED) 204, such as a smartphone, an access point (AP) 206, such as first Wi-Fi AP 110, and one or more network devices 207, such as communication servers, streaming media servers, and routers for example. Network devices 207 may be coupled to AP 206 via any combination of networks, wired, wireless and/or optical communication. The PED 204 includes one or more processors 210 and a memory 212 coupled to processor(s) 210. AP 206 also includes one or more processors 211 and a memory 213 coupled to processor(s) 211. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.@

PED 204 may include an audio input element 214, for example a microphone, and an audio output element 216, for example, a speaker, coupled to any of processors 210. PED 204 may include a video input element 218, for example, a video camera, and a visual output element 220, for example an LCD display, coupled to any of processors 210. The visual output element 220 is also coupled to display interface 220B and display status 220C. PED 204 includes one or more applications 222 that are typically stored in memory 212 and are executable by any combination of processors 210. PED 204 includes a protocol stack 224 and AP 206 includes a communication stack 225. Within system 200 protocol stack 224 is shown as IEEE 802.11/15 protocol stack but alternatively may exploit other protocol stacks such as an Internet Engineering Task Force (IETF) multimedia protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11/15-compatible PHY module 226 that is coupled to one or more Front-End Tx/Rx & Antenna 228, an IEEE 802.11/15-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238. Also shown is WPAN Tx/Rx & Antenna 260, for example supporting IEEE 802.15.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the PED 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module.

Also depicted is NR2I 270 which is coupled to the PED 204 through WPAN interface between Antenna 271 and WPAN Tx/Rx & Antenna 260. Antenna 271 is connected to NR2I Stack 272 and therein to processor 273. Processor 273 is coupled to camera 276, memory 275, display 274, and sensors 277 such as environmental (e.g. temperature, pressure, humidity, and light level), chemical, biometric, etc. Further the NR2I 270 may include an inertial sensor 278 which may be a one-dimensional motion sensor (e.g. linear or rotation), a two-dimensional motion sensor (e.g. dual axis linear or rotation), a three dimensional sensors (e.g. linear or rotation), or six-axis motion sensor (three axes linear and three axis rotation). Accordingly, NR2I 270 may, for example, utilize the processor 210 within PED 204 for processing functionality such that a lower power processor 273 is deployed within NR2I 270 controlling acquisition of image data from camera 276 and presentation of modified image data to user via display 274 with instruction sets and some algorithms for example stored within the memory 275. It would be evident that data relating to the particular individual's visual defects may be stored within memory 212 of PED 204 and/or memory 275 of NR2I 270. This information may be remotely transferred to the PED 204 and/or NR2I 270 from a remote system such as an optometry system characterising the individual's visual defects via Network Device 207 and AP 206. For example, the eSight Generation 3 NR2I supports a wired USB connection to the PED/FED as well as a Bluetooth connection. Accordingly, a Wi-Fi connection to the NR2I 270 would be via the PED/FED and either the Bluetooth or wired connection.

Optionally, the processing of image data may be solely within the NR2I 270, solely within the PED 204, distributed between them, capable of executed independently upon both, or dynamically allocated according to constraints such as processor loading, battery status etc. Further, in some embodiments computationally intensive processing tasks may be off-loaded to fixed, network-based computing resources ("the Cloud") by transmitting the image or sub-portions thereof for remote processing and subsequent return of processed text or images, for example, for recognition of characters within a text region for subsequent re-display in an alternate font or character size, language, or with other effects. Accordingly, the image acquired from a camera associated with the NR2I 270 may be processed by the NR2I 270 directly but image data to be displayed acquired from an external source processed by the PED 204 for combination with that provided by the NR2I 270 or in replacement thereof. Optionally, processing within the NR2I 270 may be offloaded to the PED 204 during instances of low battery of the NR2I 270, for example, wherein the user may also be advised to make an electrical connection between the NR2I 270 and PED 204 in order to remove power drain from the Bluetooth interface or another local PAN etc.

Accordingly, it would be evident to one skilled the art that the NR2I with associated PED may accordingly download original software and/or revisions for a variety of functions including diagnostics, display image generation, and image processing algorithms as well as revised ophthalmic data relating to the individual's eye or eyes. Accordingly, it is possible to conceive of a single generic NR2I being manufactured that is then configured to the individual through software and patient ophthalmic data. Optionally, the elements of the PED required for network interfacing via a wireless network (where implemented), NR2I interfacing through a WPAN protocol, processor, etc. may be implemented in a discrete standalone PED as opposed to exploiting a consumer PED. A PED such as described in respect of FIG. 2 allows the user to adapt the algorithms employed through selection from internal memory as well as define an ROI through a touchscreen, touchpad, or keypad interface for example.

Further the user interface on the PED may be context aware such that the user is provided with different interfaces, software options, and configurations for example based upon factors including but not limited to cellular tower accessed, Wi-Fi/WiMAX transceiver connection, GPS location, and local associated devices. Accordingly, the NR2I may be reconfigured upon the determined context of the user based upon the PED determined context. Optionally, the NR2I may determine the context itself based upon any of the preceding techniques where such features are part of the NR2I configuration as well as based upon processing the received image from the camera. For example, the NR2I configuration for the user wherein the context is sitting watching television based upon processing the image from the camera may be different to that determined when the user is reading, walking, driving etc. In some instances, the determined context may be overridden by the user such as, for example, the NR2I associates with the Bluetooth interface of the user's vehicle but in this instance the user is a passenger rather than the driver.

It would be evident to one skilled in the art that in some circumstances the user may elect to load a different image processing algorithm and/or NR2I application as opposed to those provided with the NR2I. For example, a third party vendor may offer an algorithm not offered by the NR2I vendor or the NR2I vendor may approve third party vendors to develop algorithms addressing particular requirements. For example, a third party vendor may develop an information sign set for the Japan, China etc. whereas another third party vendor may provide this for Europe.

Optionally the NR2I can also present visual content to the user which has been sourced from an electronic device, such as a television, computer display, multimedia player, gaming console, personal video recorder (PVR), or cable network set-top box for example. This electronic content may be transmitted wirelessly for example to the NR2I directly or via a PED to which the NR2I is interfaced. Alternatively, the electronic content may be sourced through a wired interface such as Ethernet, USB, I2C, RS485, HDMI, etc. as discussed above. In the instances that content is sourced from an electronic device, such as a television, computer display, multimedia player, gaming console, personal video recorder (PVR), or cable network set-top box for example then the configuration of the NR2I may be common to multiple electronic devices and their "normal" world engagement or the configuration of the NR2I for their "normal" world engagement and the electronic devices may be different. These differences may for example be different processing variable values for a common algorithm or it may be different algorithms employed when the NR2I is displaying text or images sourced from different devices.

Figure 2C:
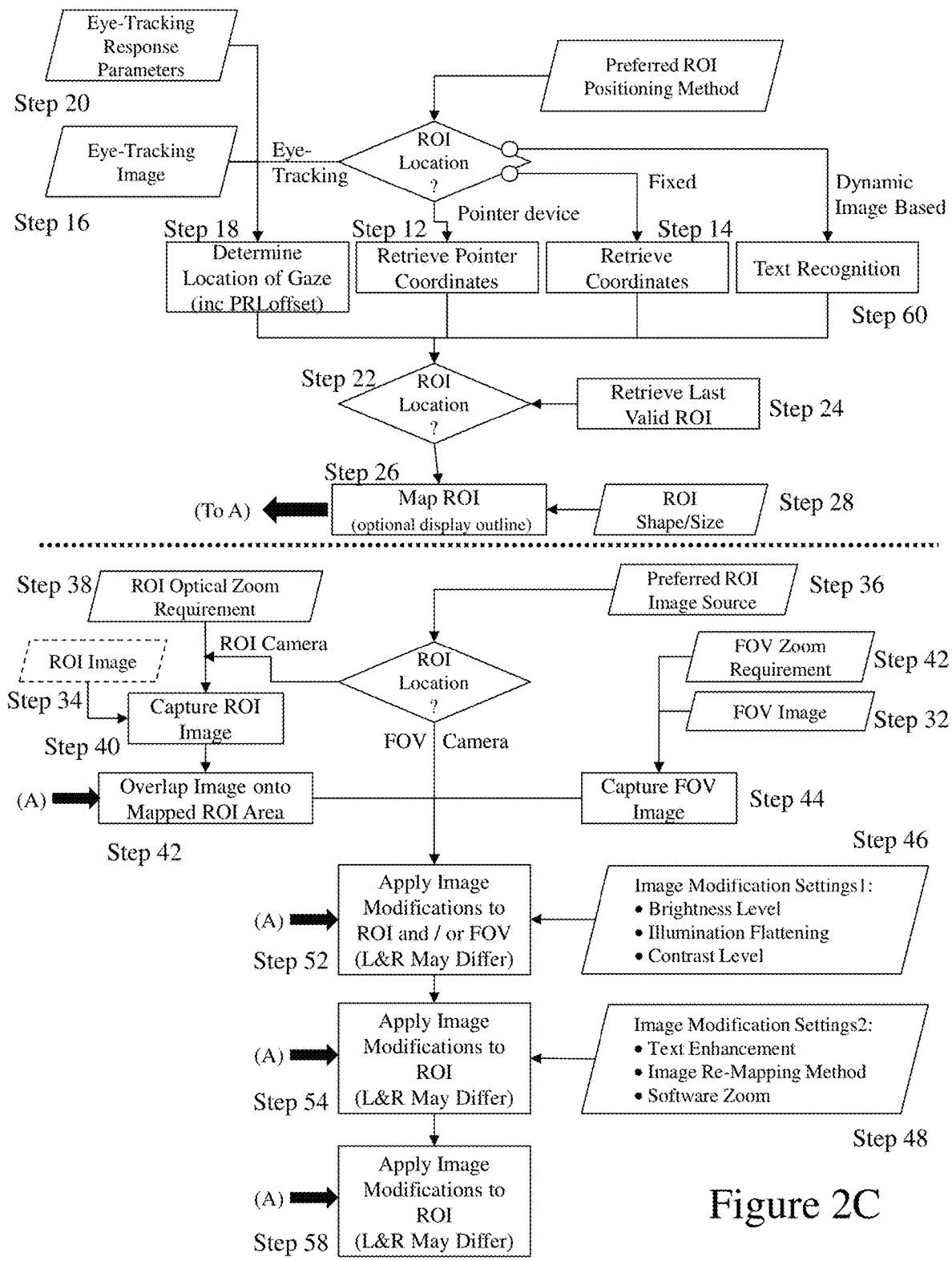
FIG. 2C depicts an exemplary process flow according to an embodiment of the invention for modifying an image to be presented to a user with an NR2I.

An embodiment of a method using a system such as depicted in either FIG. 2A or 2B is depicted in FIG. 2C wherein the process is capable of modifying an image of the field of view. As depicted the user begins by setting the preferred method of determining the location of the region of interest (ROI) through a keyboard or another input device (step 10). The individual may indicate their preferred location of the ROI by selecting one of a plurality of means, shown are pointer-device (e.g. mouse) input (step 12), preset coordinates (step 14), text recognition imaging-processing (step 60) or eye-tracking (gaze tracking/pupil tracking) imaging (step 16), or through image-object identification, here text objects, though not to exclude others (eg top-of-a-bus). If an eye tracking sensor 2028 (FIG. 2), or inertial sensor 2080 (FIG. 2A) is used, the individual need only move their eye or head, respectively, to determine the region of interest (step 18). This step includes compensating for any offset that may exist between the eye's normal healthy visual axis which aligns at the fovea, and that of a user with foveal scotoma whose PRL is non-aligned. Some mathematical parameters are applied to determine the sensitivity of the eye/head tracking algorithm in the X and Y directions (step 20) to minimize the effect of involuntary eye/head movement on the choice of region of interest, and to achieve desired image-motion (or stability) and navigation within text and images. These sensitivity parameters and thresholds may be dynamically time-varying and sensitive to the current gaze direction or word being read as related to location on the display.

Similarly, if text recognition imaging (step 60) is employed the acquired FOV image may be pre-processed to establish regions of text wherein processing of the text regions determines automatically a region of interest or the identified regions are visually highlighted such that the user then selects through gaze (eye-tracking), mouse, or inertial sensing to determine user's head movement. Optionally, the text recognition may employ other data such as location data, user calendar data, etc. to provide a context within which the text recognition is performed. For example, a context of a bus stop, railway station, tram stop etc. the process would define that a region of interest is the route identifier of approaching transit vehicles. If the context was alternatively walking down the street then text might be names of stores, restaurants etc. Within a driving context the text recognition may establish a temporary region of interest as a highway sign relating to an upcoming junction.

From this information, the center of the region of interest (ROI) is determined. If the newly-determined region of interest (ROI) is not within the viewing area (step 22), the region of interest is set to the last valid region of interest (step 24). The complete region of interest (ROI) is then determined, or "mapped" such that it is centered on the coordinates determined (step 26). The size and shape of the ROI is determined through user inputs (step 28). The visual information in the region of interest (ROI) may be input from either the field of view (FOV) image (step 32), or from a separate region of interest image source (step 34), as determined by user input (step 36). If the ROI image is to come from a separate source (step 36), then the user can input an optical zoom requirement (step 38) for this image. The ROI image is then captured (step 40) and overlaid or mapped, onto the ROI area (step 42).

Figure 2D:
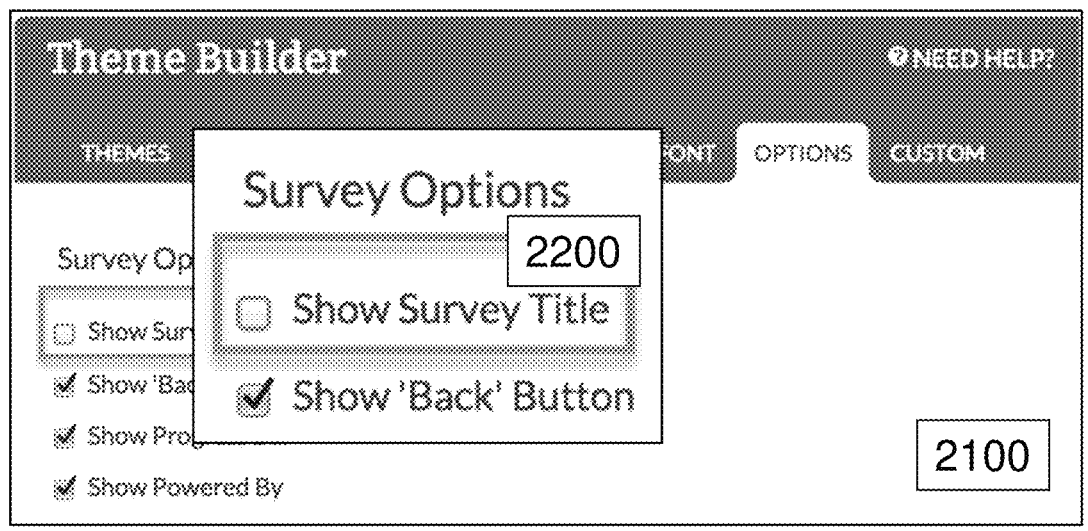
FIG. 2D depicts an image modification applied to text based content for presentation to a user of a NR2I according to embodiments of the invention for all users.

The individual sets the zoom requirement (step 44) for the field of view (FOV) image. The zoom function is a combination of both optical zoom done in the FOV camera using lenses, and digital zoom performed in software. The FOV image is then captured. (step 44). The image is then modified (steps 24 and 25) as further required by the user input values (steps 46 48, and 54). Note that some modifications are applied to the left and right displays, or left and right eyes, differently (step 52), while others are applied to the left and right displays equally (step 54). Any of the image modifications may be applied to either the region of interest (ROI) or the entire field of view (FOV), or both. The final modified images are then presented to the displays (step 58). FIG. 2D depicts an example where an image presented to a user viewing a menu screen 2100 of an application wherein the region relating to their ROI is magnified, overlay 2200. Optionally, the location of the magnified ROI may track the user's gaze/ROI, it may be static, or it may be magnified but offset from either the ROI and/or a region of the user's field of view (FOV) relating to a visual defect such as determined and mapped during an ophthalmic examination.

Optionally, within an alternate embodiment of the invention a FOV image may be acquired, processed to determine whether a region containing text within the image is present, and the ROI established based upon this determination. Optionally, this may be augmented with depth mapping of the image such that if multiple regions containing text are present the ROI is set to the region having lowest depth. Optionally, the ROI may be set to transition through multiple regions sequentially with timing determined by preferences/settings of the NR2I system or user input.

Figure 3A:
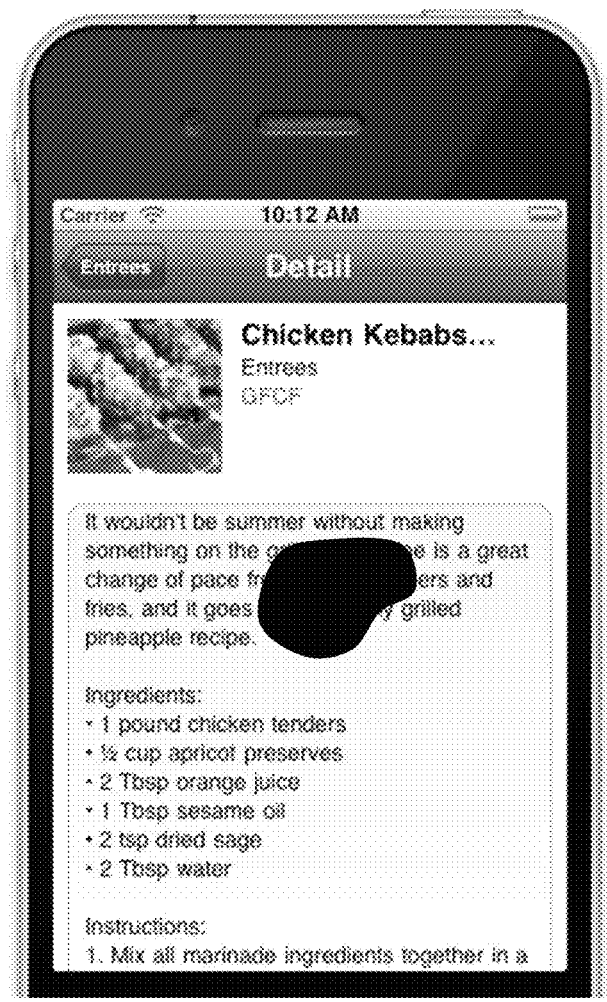
FIG. 3A to 3D depict examples of image modifications applied to text based content for presentation to a user of a NR2I according to embodiments of the invention based upon avoiding a retinal defect of the user.
Figure 3D:
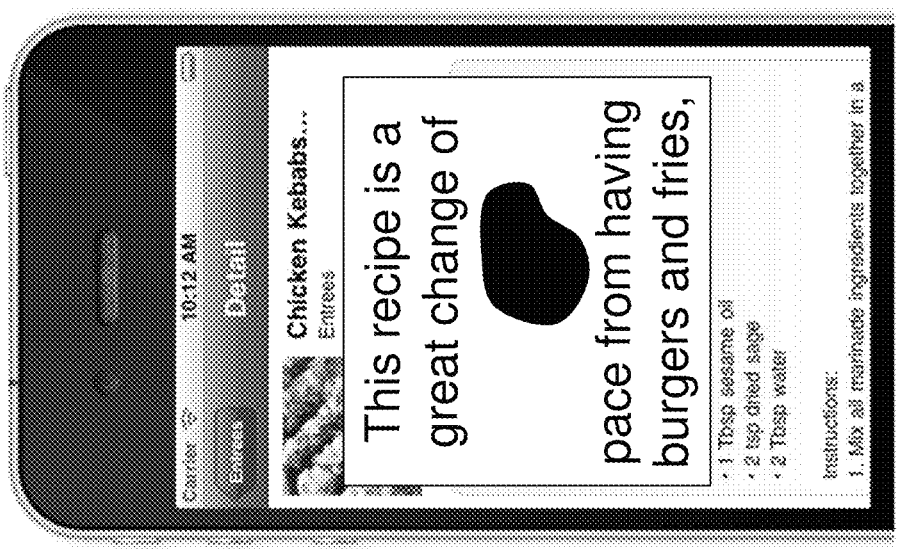
Figure 3C:
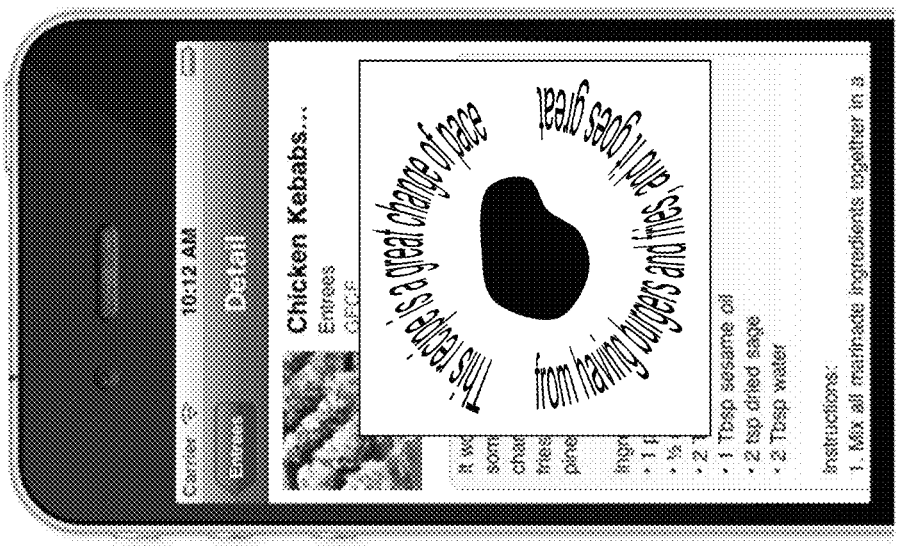
Figure 3B:
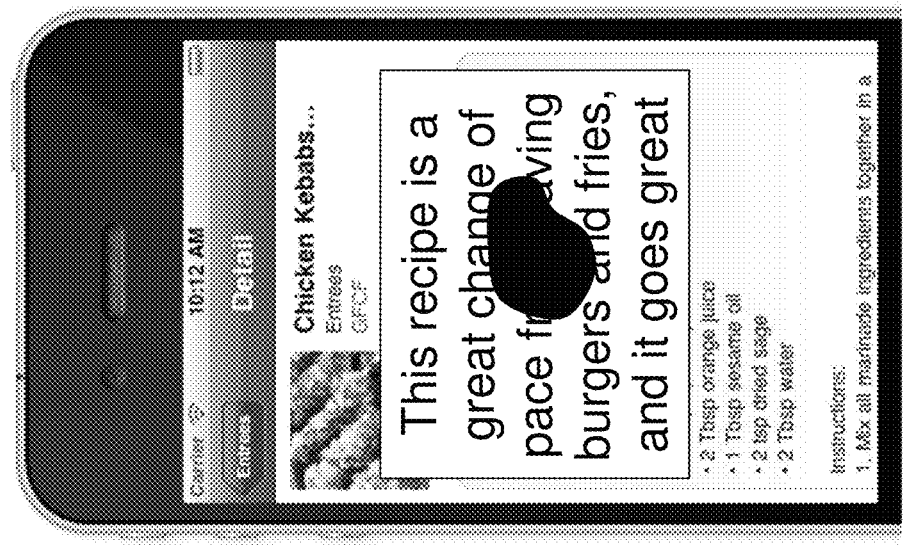

Referring also to FIGS. 3A to 3D there are depicted an original user view (FIG. 3A) together with modified displayed images (FIGS. 3B to 3D) using an application according to an embodiment of the invention as executed and displayed to a user with a system such as depicted in FIGS. 2A and 2B wherein the system is employed to correct a vision defect in one eye of the individual. In this example, an individual has a defect in his or her visual field that causes a perceived image defect as shown in FIG. 3A. As a first step, an ophthalmologist performs an eye examination on the individual, mapping the areas of the eye which are not functioning properly. This information is downloaded to the memory 2038 of the processor 2014 through the I/O module 34. The processor can then map the image to avoid the defect as is shown in FIGS. 3B, 3C and 3D. The end result is that the remapped image removes loss of information (previously hidden behind the defect) caused by the defect as shown in FIGS. 3B and 3C. In FIG. 3B the text is magnified about the defect region, while in FIGS. 3C and 3D the text is remapped to be spaced about the defect. Thus, with training the individual is capable of seeing a full image substantially free of distortion. The individual may perform many types of image modification by entering data through the keypad of the NR2I or by speaking instructions through the microphone of the NR2I.

The NR2I is designed to help anyone having to deal with visual challenges which cannot be addressed by simple optical means (glasses, contact lenses, etc.). Visual challenges can be due to either less than optimal performance of the visual system or environmental conditions. The visual system is a complex structure which combines an optical imaging system (the front end of the eye), a network of sensors (the photoreceptors) positioned at or near the focal plane of the imaging system and a complex neural network (and its supporting infrastructure of cells) for processing the information from the sensors into a visual signal. A problem in either the optical, sensing or neural component of vision will result in less than optimal vision. The resulting visual problems can manifest themselves in many ways including, but not limited to, a reduced ability to see fine details; a reduced sensitivity to contrast; a reduced ability to extract colour information; a loss in peripheral field of view; a loss of central field of view; and an increased sensitivity to brightness.

The invention is not disease specific or environment specific but rather it is able to address and provide textual vision modifications to users with and without any major disease or diseases as well as many other retinal conditions (such as, but not limited to retinopathies, optic disc neuropathies, Stargardt's disease, retinal dystrophies, most variations of macular/foveal edema, etc.) short of profound blindness, by adjusting or augmenting the image presented to the user thereby improving the user's visual experience. The proposed solutions can also be helpful to patients with degraded optical properties including optical errors in the cornea, the crystalline lens and any issues with the liquid contained within the eye (scattering sites, opacification, etc.).

Further, embodiments of the invention are able to help people with visual problems due to higher level processing errors in the brain such as, but not limited to, compensating for missing portions of their field of view, problems with tracking such that the displayed image is moved to compensate either in or counter to the tracking direction, problems that are helped by improving mental focus and removing peripheral distractions (such as dyslexia), etc.

Outside of visual problems, there are many environmental conditions that can lead to poor visual information transfer. For example, trying to look at a sign and read the text when they are in front of the sign on a bright sunny day wherein the image can be selectively filtered/processed to reduce the surrounding intensity whilst brightening and/or increasing contrast within the textual image or the image may be processed such that the text is presented to the user in a different region of the screen, presented upon a PED of the user, or providing orally/tactilely to the user. Accordingly, an NR2I can reduce the impact of the environmental condition on their visual performance as well as provide alternate prompts, displays etc. to lessen the impact of the environmental conditions where the alternate prompt display etc. may be contextually defined or determined. As such processing the textual content of images to users with an NR2I may provide benefit to the users during routine daily life, work, leisure activities etc. Further, the NR2I can enhance the amount of information available to normally sighted people. It can overlay multiple sources of information on the same field of view.

In order to correct for both visual defects relating to the user and environmental factors the user may issue instructions that cause the processor 2014 to perform operations on the image acquired/received or the processor 2014 discretely or in conjunction with other processing resources, such as upon a PED associated with the user and their NR2I, may automatically determine the processes to apply based upon knowledge which may include, but not be limited to, the user's visual defects, vision capabilities/limitations, image content, ROI, FOV, environmental conditions, and context. These processes may include, but are not limited to:

1. Magnification of FOV and/or ROI: this function permits the FOV and/or ROI to be magnified and the resolution increased up to that of the resolution of the image to be presented and/or the resolution of the display presenting the image.

2. Minification of FOV and/or ROI: reducing the FOV and/or ROI to a smaller size to account for display of additional information and/or processed image content as well as addressing vision conditions which manifest themselves as "tunnel vision" for example, wherein this may also be considered as fractional magnification.

3. Enhance Contrast in entire FOV and/or ROI or predetermined regions of the FOV and/or ROI: this function permits contrast contained naturally in the image to be modified so as to enhance the difference between various levels of contrast to improve the detection of information in the image.

4. Enhance Edges in entire FOV and/or ROI or predetermined regions of the FOV and/or ROI: this function permits the edge of an object in the field of view to be detected and enhanced. For example, an edge may be dynamically displayed at two or more different combinations of spatial position and spectral content such as dithering, for example, between a black narrow edge and a red wide edge. Optionally, the extent of the spatial position/spectral shift together with temporal characteristics may be varied in accordance to the processed text within the FOV and/or ROI. In this manner, whilst all text may be identified important text associated with user context may be highlighted differently in order to draw the user's attention to it. For example, a warning sign for a driver may be highlighted with greater depth or frequency of variations to attract user attention than that applied to an information sign. Other forms of highlighting (applicable to all uses of the term in this application) might consist of though not be limited to: colour change, differences or variations in time or space, bold or italicization, font, contrast, edge enhancement, font size, etc. Optionally, edges may be processed in conjunction with depth mapping information to associate an identity of an object which then may be presented in text form.

5. Change to grey scale the entire FOV and/or ROI or predetermined regions of the FOV and/or ROI: this function permits the image to be converted to a grey scale from a colour scale such that identified text is then displayed in colour as an overlay increasing its visual distinction to the user.

6. Threshold grey scale the entire FOV and/or ROI or predetermined regions of the FOV and/or ROI: this function permits all the colours and intensities of the image to be mapped into either black or white wherein identified text is then displayed in colour as an overlay increasing its visual distinction to the user or the text may be mapped to the inverse of the local region.

7. Remap colours in the entire FOV and/or ROI or predetermined regions of the FOV and/or ROI: this function remaps the colours in the original image into another range of colours, thereby permitting colour blindness or deficiency to be ameliorated. Identified text within the image may be mapped to a colour 8. Remap image based on the user's blind spot in ROI: this function allows the individual to remap the image to avoid the blind spots caused by diseased regions of the eye. Optionally, the relocation may be only the text within the image such that, for example, all text is remapped to a banner region of the image at a predetermined location/region determined by the user or in determination of the image.

9. Relocation and Enhancement of Text: Similar to the movement of text in (8) above but the text is moved and processed. For example, application sensitive techniques such as only splitting the image on the blank lines between text lines, serif removal, text edge smoothing, text enhancement through colour and contrast improvement, straightening of text images warped due to angle-of-view and perspective effects, optical character recognition (OCR), etc. may be applied to the text elements.

10. Brightness adjustment of the entire FOV and/or ROI or predetermined regions of the FOV and/or ROI: Individual pixels can be modified to increase or decrease their brightness either globally or according to a mathematically defined spatial distribution.

11. Brightness flattening of the entire FOV and/or ROI or predetermined regions of the FOV and/or ROI: The variation in brightness across an image can be reduced, such that "hotspots" or washed out regions are darkened, and dark areas are brightened.

12. Image Superimpositioning: Where peripheral information is overlaid into a central area of the FOV, in order to provide contextual data to people with lost peripheral visual performance.

14. Colour Identification: The invention can identify (via screen text) the dominant colour or the statistical red-green-blue (RGB) content for a specific portion of the image, as identified for example by "cross-hairs." This may be used in isolation or in combination with OCR/text processing to associate contextual information in isolation or in combination with shape processing such that for example "stop" on a green sign is processed differently to a red sign or a red octagonal sign.

15. Black/White Conversion and Inversion of field of view or region of interest: Colour or grayscale images can be reduced to B/W or inverted B/W (W/B).

Figure 4A:
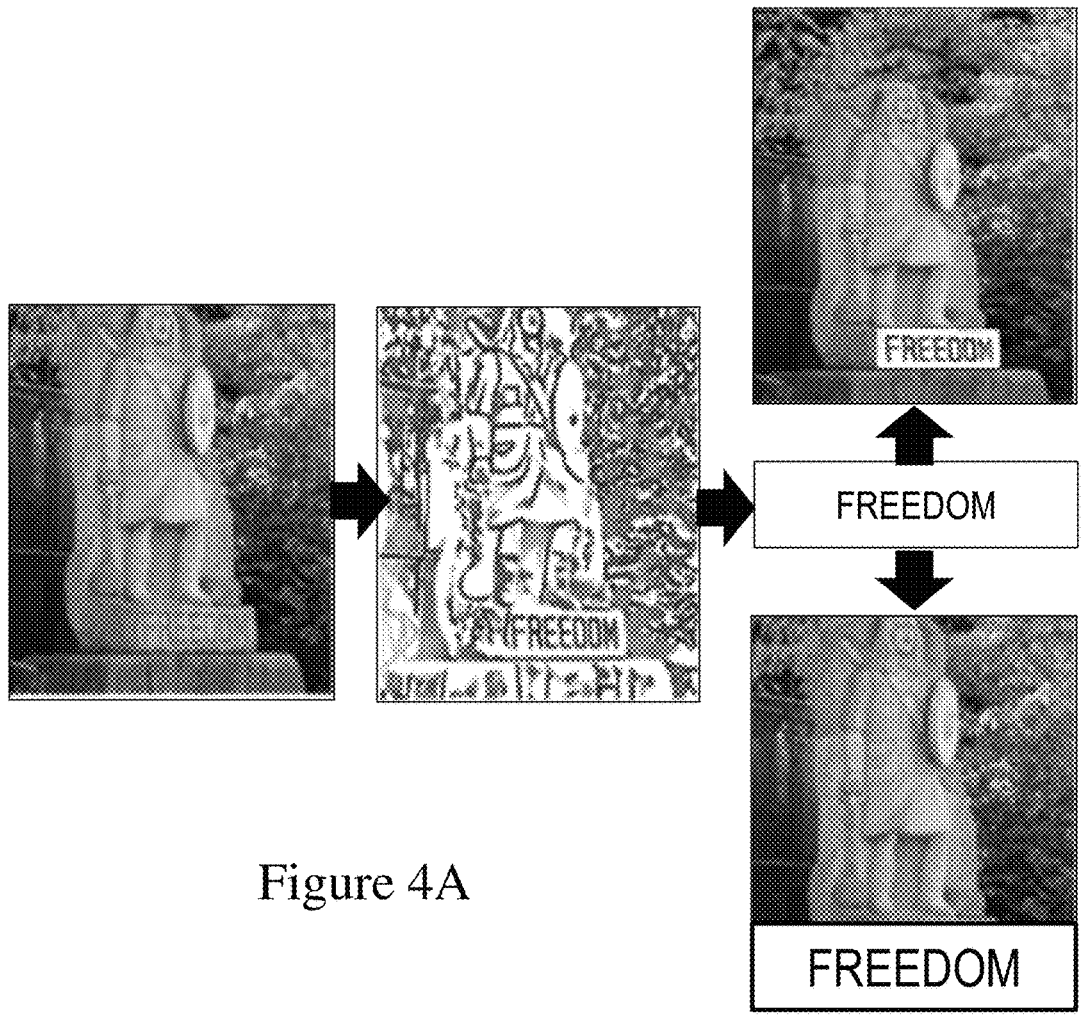
FIG. 4A to 4C depict image modifications applied to text based content for presentation to a user of a NR2I according to embodiments of the invention for all users.
Figure 4B:
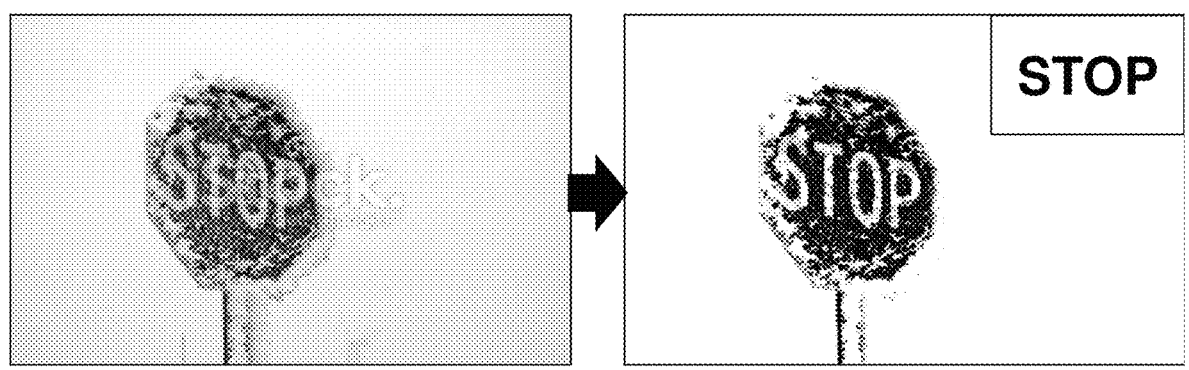
Figure 4C:
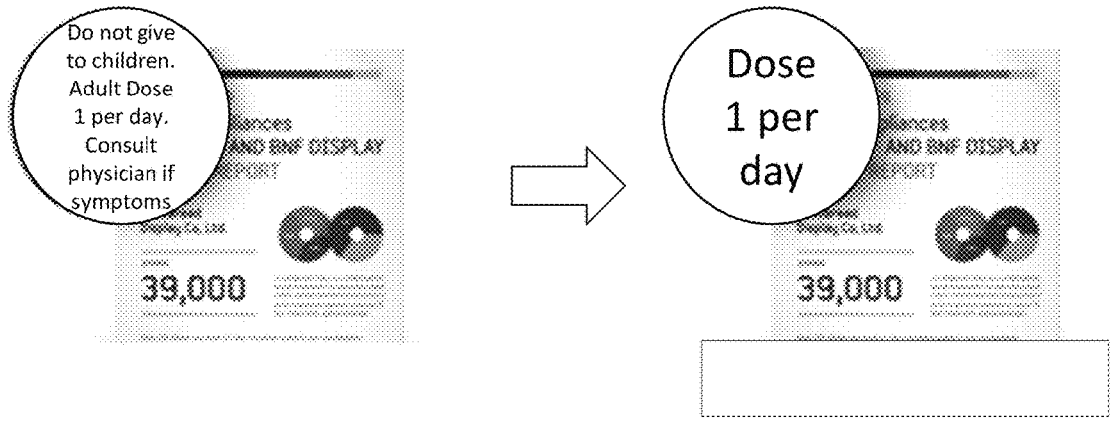

Referring to FIG. 4A an example of text detection within an image by stroke width transformation and optical character recognition is depicted wherein the word "Freedom" is isolated at the foot of the statue and presented to the user. In contrast in FIG. 4B an image is presented to the user after contrast adjustment and OCR to determine that the sign says STOP. Referring to FIG. 4C the displayed ROI has been processed for salient text that has then been enlarged, threshold for black and white conversion, and inverted for enhanced contrast. Accordingly, the user is presented with "Dose 1 per day" rather than hunting for the dosage within a block of low contrast text in the original expanded ROI image.

Similarly, an example of a colour remapping algorithm is next described. Normally sighted people depend on both brightness and colour differences (luminance and colour contrast) to identify features in their visual field. Abnormal colour vision will often result in the inability to distinguish between colours; a reduced capacity to use colour contrast to extract information. Colour confusion is usually asymmetric, so that colour confusion occurs along the Red-Green or Yellow-Blue colour axis. This means that by remapping colours in the field of view which are confusing to an observer to colour in the spectrum which offer better contrast, it is possible for the user to recover the information content of the field of view.

The algorithm described below is intended to remap the colour contained in the field of view to allow the user to extract maximum content information. The colour content of the processed field of view will not be true to the real world thus actual colour information will not always be natural, but the colour contrast will be enhanced for the observer so that there will be little or no confusion due to reduced colour contrast between the objects in the field of view. This will allow the observer to identify a maximum number of details and maximize information extraction.

Figure 5:
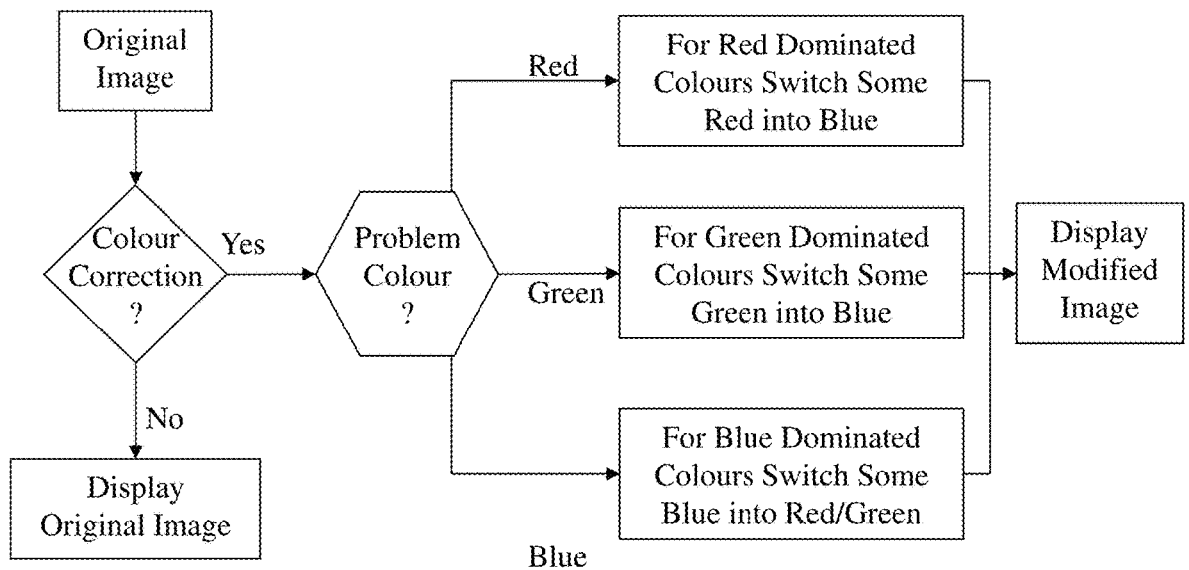
FIG. 5 is a flowchart describing an embodiment of an algorithm to modify colours in order to improve the usability of an image for people with specific colour deficiencies.

Such an algorithm is illustrated in FIG. 5. If a colour perception defect is identified in a patient, then the image is modified by shifting some of the colour in the defective colour channel (Red-Green or Blue-Yellow) in the other colour channel. Two parameters are typically required. The first is to identify which colours in the image must be modified, and the second is to determine the amplitude of the colour shift necessary to move the affected colours to the unaffected colour channel.

First, the colours to be modified are selected by the amount of the affected primary colour (Red, Green or Blue) in the image. For example, if the colour defect is the inability to detect colour contrast in the red/green channel, then either the reds or greens are shifted to the blue channel; whichever gives the observer the best contrast. Given that White will contain 33% of each Red, Blue and Green primary colour, then the threshold for shifting a given primary colour should be >33%. The threshold will be both observer and image dependent and will need to be adjustable. The amount of remapping to the better colour channel will also be observer dependent as well as image dependent and thus it too will also need to be adjustable.

For each point in the image, where R, G and B represents the intensity of each primary colour, the algorithm proceeds as follows:

First, the RGB values are measured, and the brightness (T) (T=R+G+B) and the normalized colour values (r,g,b) (r=R/T, g=G/T, and b=B/T) calculated. Next, for each point in the image where the colour contains more than the threshold amount of the problematic primary colour, a percentage, shƒ, of the problem primary is shifted into another primary colour.

For example, if (r) is the normalized value of the problematic colour then if r>0.4 then red the primary colour is more than 40% of the colour of the image and hence above the threshold r(n)=(1−shƒ(r)), where r is the normalized value of the problematic colour, and r(n) is the new normalized value for the shifted red primary colour. Similarly, b(n)=b+shƒ*r where b(n) is the new normalized value for blue primary. Finally, g(n)=g which means the normalized primary colour green (g) is unmodified.

One skilled in the art would recognize that if red is not the problematic colour, then similar shifts are possible for the other primary colours. Thus, if the problem primary colour is green (g) then the algorithm will shift some of the primary green colour (g) into blue. Similarly, if the primary colour blue is the problem, then the algorithm will shift blue into red.

Figures 6A, 6B, 6C:
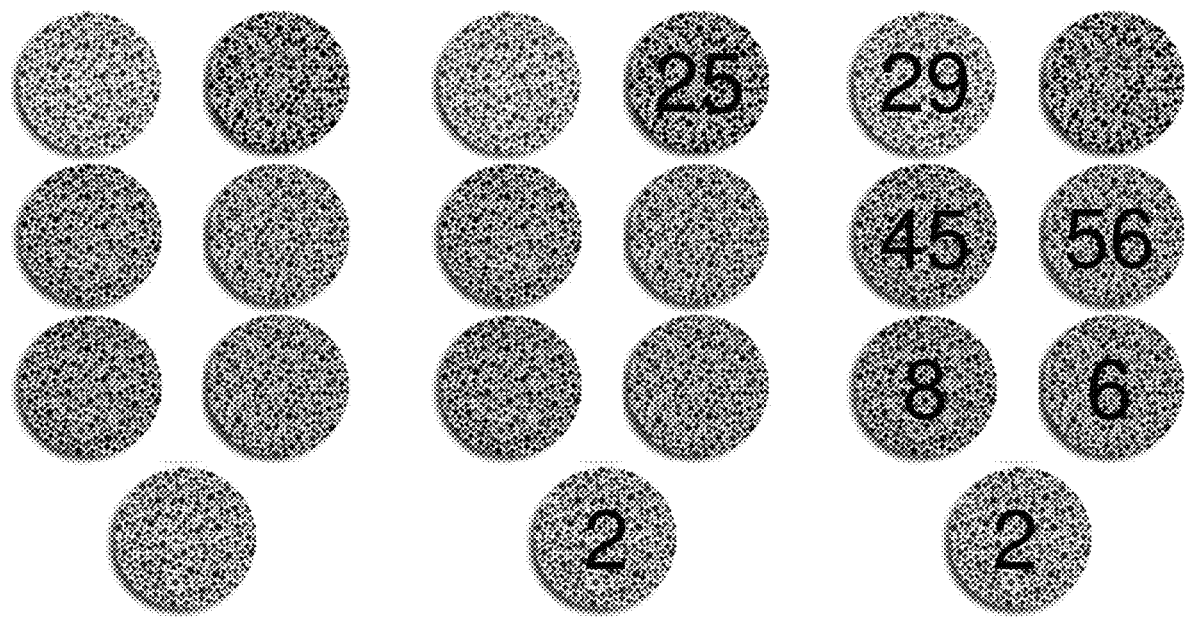
FIGS. 6A through 6C depict the results of an image enhancement algorithm that improves the usability of an image for people with specific colour deficiencies.

The new RGB coordinates of the point being examined is then the new normalized shifted colour times the brightness T. Thus Rn=rn*T, Gn=gn*T and Bn=bn*T. The results of this algorithm are shown in FIGS. 6A to 6C.

An embodiment of the algorithm for automatic brightness and contrast enhancement transforms the image based on the intensity (signal) histogram distribution for the whole image. This technique is usually referred to as brightness/contrast equalization. An intensity distribution (number of pixels at each intensity levels), $D_A$, from the original image (A) is remapped into a new image (B) with distribution, $D_B$, with the constraints that the remapping result be single valued (each intensity level in $D_A$ can only transform to a single intensity level in $D_B$) and that the transform be reversible or monotonic.

These constraints are embodied in the equations $D_B=f(D_A)$ and $D_A=f^{-1}(D_B)$. Many different transforms can be used that meet these constraints. One embodiment is the algorithm discussed below. This algorithm is a simple and effective approach that is widely used in the image processing world.

This embodiment of the algorithm adds additional constraints to the determining the mapping function $f(D_A)$. In one embodiment, an additional requirement is that the energy contained within a small region ($dD_A$) of the distribution $D_A$ must equal the energy to the corresponding region $dD_B$ of the distribution $D_B$. That is $h_A*dD_A=h_B*dD_B$, where h is the number of pixels at a predetermined intensity level, (x). If the values of h are rescaled by dividing the value by the total number of pixels, then the values of h can be expressed as probability distributions $p_A$ and $p_B$. Furthermore, because the intensity distribution is being stretched from the original image (0 to a maximum intensity, $D_M$) and because the area under the two probability distributions must be equal as described above, then the derivative of the transfer function $df=df(x)/dx$, can be set to a constant equal to $D_M$.

The transform function is then rewritten in terms of the probability distribution $p_A$ and $D_M$ as $f(D_A)=D_M*\int p_a(u) du=D_M*F_A(D_A)$ where $F_A(D_A)$ is the cumulative distribution function for the original image. The implementation then becomes the following sequence of steps:

Step 1: Obtain an intensity distribution function for the original image with the same number of bins available as there are available grey levels for the display mode (that is, 8 bits gives you 256 potential bins.)

Step 2: Normalize the distribution function by dividing it by the number of pixels to convert the distribution function to a probability function.

Step 3: Find the largest gray level with a non-zero value in the original image and set this to $D_M$.

Step 4: Create a cumulative distribution function: For example bin 0 is the number of pixels of brightness=0; bin 1 is sum of the number of pixels in bin 0 and 1; bin 2 is sum of pixels in bins 0, 1, 2; and so on.

Step 5: For each pixel, obtain the intensity, I(c, r) where c and r are the column and row indices, and find the cumulative probability for that intensity I(c, r); a value between 0 and 1.

Step 6: Multiply this value by $D_M$. This is the new value of the intensity for that pixel, after equalization.

Step 7: Finally, to obtain stretching as well, multiply the new intensity value by the ratio of the maximum possible for display divided by $D_M$. This step ensures the maximum contrast.

FIG. 6A depicts a grey-scale images of a standard colour blindness test image. Next in FIGS. 6B and 6C depict grey-scale images of the colour blindness test image with the green shifted to blue and red shifted to blue, respectively. Thus a person with red-green colour blindness would be able to easily see portions of the image which would normally appear hidden.

Figure 7:
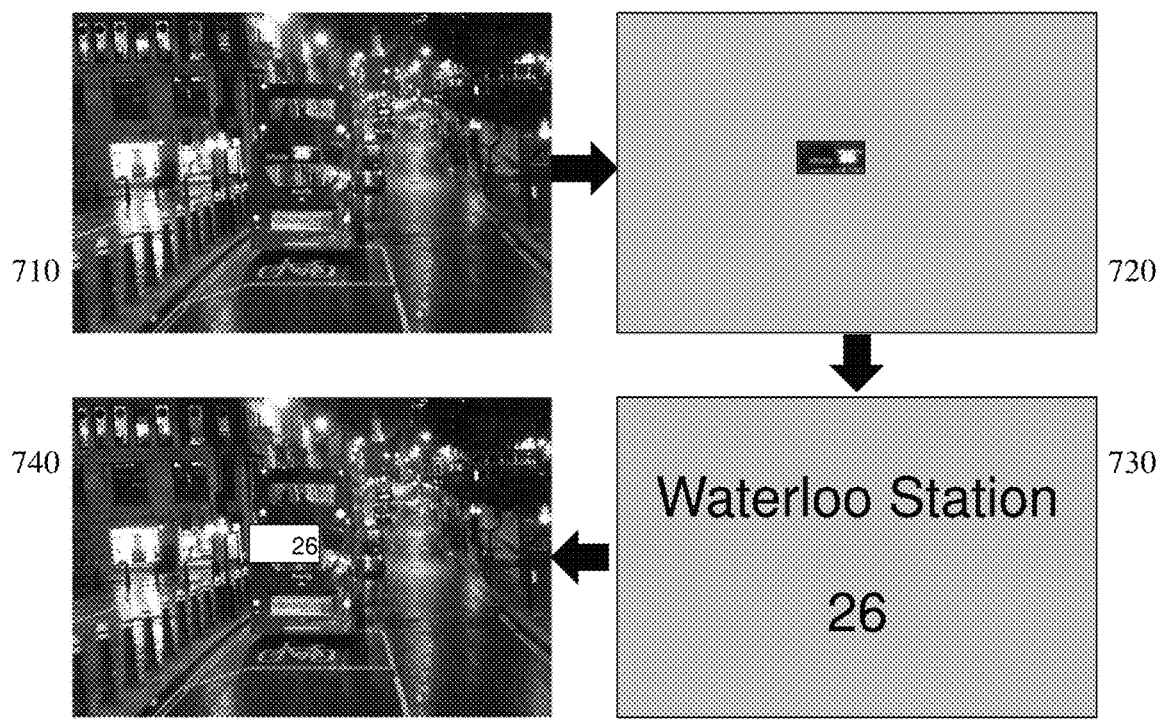
FIG. 7 depicts an original image acquired with a camera, the extraction of a text region, and the enhancement and display of text from within the region to a user upon an NR2I according to an embodiment of the invention.

Within embodiments of the invention the regions of text to be processed/modified may be defined statically from an image acquired (e.g. by a camera forming part of the NR2I) and/or received from another source (e.g. streamed content to user's PED, camera in user's PED etc.). For example, the user may indicate the image acquisition through a command to an application in execution upon the user's PED, through a gesture with their hand captured by the camera, through a vocal command, or through a gesture with their head such that the inertial sensors within the NR2I capture the motion and correlate it to a gesture, or an eye-based gesture such as "wide-eyes" where the intensity of concentration upon an object being gazed at is correlated to the open-ness of the eyelids, or squinting, blinking or winking. Whilst the image is captured and processed the user is still presented with acquired image/video content. The user may be provided with an indication that an item of content is being processed, for example, as part of an initial processing step the region within which text is identified is subsequently highlighted to the user so that they know it will be processed and the content provided to them according to the system defaults or their preferences such as an overlay, a banner at the top or bottom, as audible text, etc. Such an instance of this is depicted in FIG. 7 wherein the acquired image 710 is processed to extract the region to be processed, second image 720. The processed image is then subjected to OCR to extract the text, third image 730, which is then re-displayed within the field of view image in a predetermined location, as depicted in fourth image 740. As depicted in fourth image 740 only part of the text extracted is displayed to the user, the bus number, and it is displayed in modified form in the location it was extracted from. In other embodiments of the invention the full text may be recognized and presented. Alternatively, additional information may be added based upon context such that for example only the number "26" is on the back of the bus but the process having established it as the "26" bus knows the location ("St Paul's Cathedral") and orientation of the user (west facing) so that the rear of the "26" is those going to and terminating at Waterloo Station. If the user was east facing, then the text displayed to the user would be "St Mary of Eton Church.".

The region established for text extraction may be the entire image area or a sub-section or sub-sections thereof and may be defined for example using basic region assignment such as with a simple geometric boundary such as a rectangle, circle, ellipse, triangle etc. (which may match a sign based upon pre-processing of the region identifying a shape) or through more complex regular and irregular polygons or shapes defined by polylines, X-Y coordinates etc. The region defined may then be subjected to different processing to that of the main image, as depicted in FIG. 8, in order to facilitate either presentation to the user or character recognition for presentation.

Figure 8:
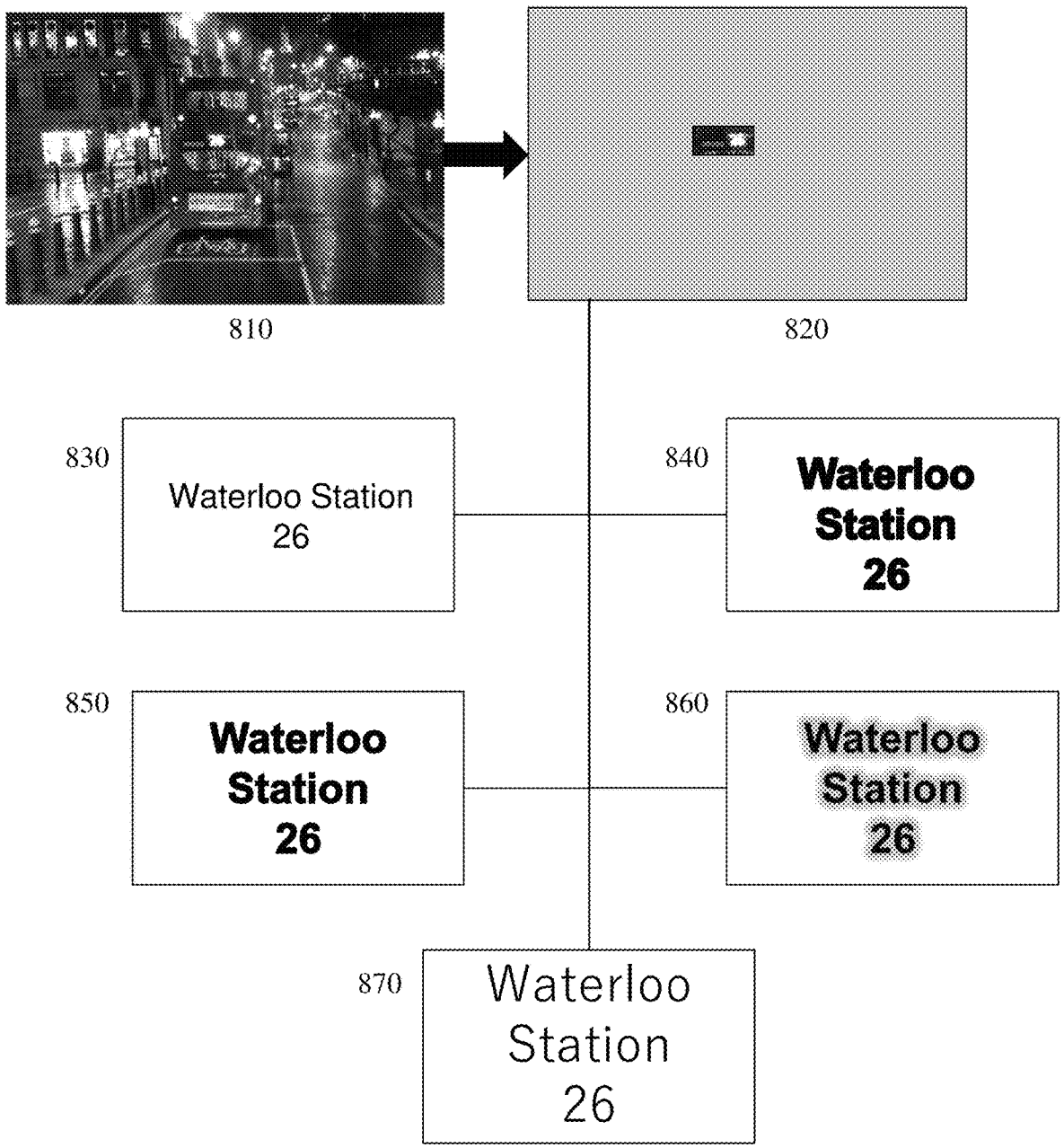
FIG. 8 depicts examples of text enhancements applied to text within a text region established as described in respect of FIG. 7 according to an embodiment of the invention.

As depicted in FIG. 8 the acquired FOV image 810 is pre-processed to extract the region relating to the route identifier on the bus, in this instance, in second image 820. The text is recognized, "Waterloo Station 26", and then according to the preferences of the user and/or visual dysfunction(s) of the user the recognized text is displayed in modified form such as with different fonts, different font sizes, edge highlighting, visual effects etc. such as depicted in first to fifth images 830 to 870 respectively.

In the example of FIG. 7, the system might be pre-programmed for a specific task, in this example, that the user is engaging in a specific travel route using public transit, using known bus routes, in a known sequence, so that the text-region selection process is tuned to hunt first for busses, then for the route number on the bus, then to perform OCR upon discovered text, and provide different alerts (visual highlighting, audible alert, speech synthesis, etc.) depending on whether a match to the desired route is found. Frequently OCR algorithms will fail to identify text in a large complex image, but by cropping to just the image-area where relevant text is known a-priori to be found, e.g. the upper front of a bus as this is where the route identifier is predominantly located when seeking a specific bus for the user, the OCR algorithm will then succeed in identifying and recognizing the text in the cropped image (even if the text region image is unaltered, i.e. the algorithm's operation may be improved simply by elimination of information extraneous to the desired recognition task). so that it can then be enhanced as required for display. This a-priori knowledge technique can also be used in other tasks and for other purposes. For example, shopping assistance might tune towards finding image-areas with product bar-codes, product-labels, and then perform the recognition algorithm on subsets of the total image whilst driving-assistance might first hunt out and crop image-areas containing signage.

Within another embodiment of the invention regions of text are determined automatically based upon a ROI of the user or if a substantial portion of the FOV is text, such as when the user is reading a book, newspaper, etc. or viewing a webpage or other image source with high text content then the processing may proceed from a predetermined point and seek to convert all text in a series of blocks such that as a user, for example, turns a page within a book then the process begins with the top region (for example unless the context/user preferences define differently) and then proceeds down such that the user is not waiting for full page or full screen conversion before being presented with the processed text. In another embodiment the text regions are determined dynamically using automated text-recognition algorithms operating upon the image data.

Figure 9:
FIG. 9 depicts a processed image captured of a field-of-view according to an embodiment of the invention containing text from a newspaper together with automatically defined bounding-boxes for different text regions.

Now referring to FIG. 9 there is depicted an image of a FOV containing mainly text, the image of a newspaper 901, although it could be a journal, website, menu, or other presenting text as a substantial portion of the FOV. It would be evident that when text is image-captured from such FOV images and text sources that the FOV image is subject to a variety of effects including, but not limited to, environmental lighting, shading, off-center and off-axis capture, non-linear geometric relationships between text orientation and camera orientation, etc. resulting in skewing, etc. of the content within the image. Whilst the orientation of text columns 911 are well-aligned through the printing/layout processes to each other, the columns of text 904, 905, 906 relative to text columns 911 are skewed as the newspaper, in this instance, was not flat and aligned during image capture. In such instances the system will generally easily find the areas and orientation of text regions and display these identified regions to the user than to actually perform OCR on all discovered text.

In the example of FIG. 9, headlines 902 and bylines 903 are identified distinctly from actual columns of text 904, 905, 906, for example using different colours for the bounding-boxes. These headlines 902 and bylines 903 etc. being established through different font, font size etc. The image might be captured multiple times at various exposure levels, then correlated and composed into a single image with expanded dynamic range and contrast prior to processing. The image may be "cleaned up" prior to OCR through simple cropping, re-alignment, spatial image warping (e.g. to flatten and straighten images or curved or misaligned text), colour-re-mapping, contrast-enhancement or binarization, edge enhancement, etc.

Text boxes or likely text locations may be identified prior to OCR through any of several means. In some embodiments, line-width and orientation analysis in combination with interstitial white-space analysis is used to identify blocks of text prior to OCR. In some embodiments apriori object information is stored, so that, for example, a navigation aid application will hunt above head-height around identified vertical pole-like objects for attached rectangular objects containing text, ie street-signs, or near the top of a bus, in the earlier example of FIG. 7. In some embodiments only one or more smaller regions of the total image are sent to the OCR processing function, ie those regions where pre-processing or user-selection (including gaze-based and other selection-means) has determined the greatest likelihood of finding recognizable characters. Separate metrics for stroke-width, alignment, white-space and object-match with appropriate inter-metric weighting and thresholding is used to determine when it is deemed likely that a region contains text, and so to draw the text-box around it. Other means are not excluded.

Figure 10:
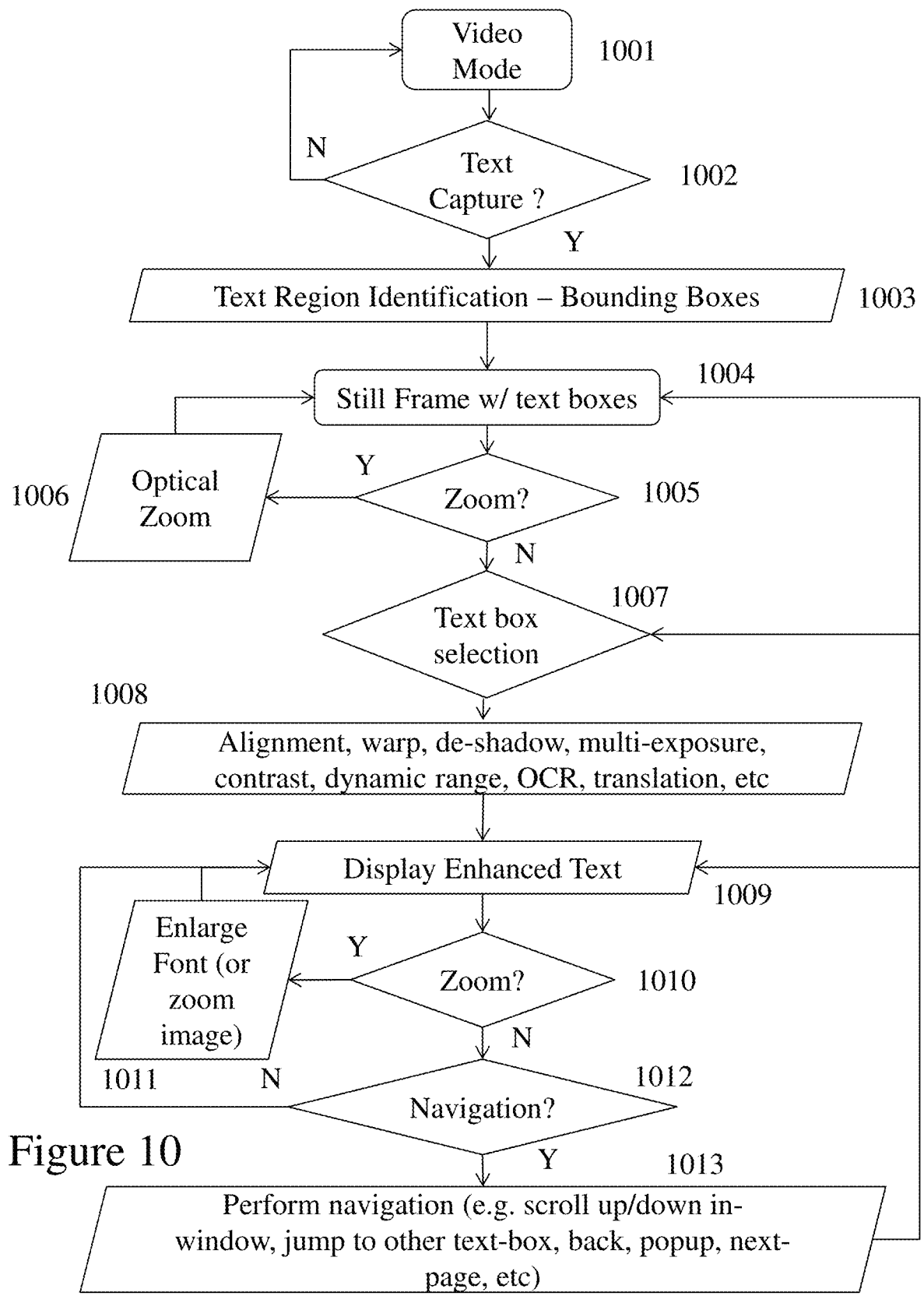
FIG. 10 depicts an exemplary flow-chart with respect to perform text region identification, enhancement, and navigation according to embodiments of the invention.

FIG. 10 depicts an exemplary flow-chart with respect to performing text region-identification, enhancement, and navigation. In normal video mode 1001 whilst using the NR2I systems according to embodiments of the invention the user is presented with continuous images. Upon receiving an indication from the user that they desire enhanced text viewing at step 1002, the system may capture a single image (with further image captures optionally proceeding in the background), and begin to operate upon it in step 1003, identifying blocks of text using a-priori information (e.g. "the text is to be found near the top of a bus"), or based on stroke-width analysis, white-space identification, or other means, to produce a still-frame image with text boxes 1004, for example as depicted in FIG. 9, image 901). Depending upon the visual acuity of the user, they may require additional image zoom on the still image before being able to provide an indication of a text-box-selection (step 1006). The text-box selection step 1007 might be performed by any means, including but not limited to gaze-tracking, inertial sensing, a pointing device, voice command, gesture etc. The system may interact with the user in step 1007, for instance highlighting the various text boxes in succession as the user provides yes/no indications of their interest in the contained text.

Once the text box has been selected, the image may be prepared before an attempt at Optical Character Recognition (OCR) or direct display is made in step 1008, including compensation for mis-alignments, curvatures, ambient lighting, shadow and glare, multi-exposure high-dynamic-range processing, contrast stretching grey-scale conversion, or binarization, for example. If OCR is to be performed, an optional language translation function may be specified before display step 1009. If the user desires to zoom in on OCR-regenerated text 1010, a larger font is employed 1011 as opposed to employing optical zoom. The user may navigate within the text-box, or between text-boxes in steps 1012 and 1013 respectively. In some embodiments OCR is not employed, rather only image-enhancement techniques are employed. In these cases after ambient light and shadow correction, alignment and de-warping, and dynamic range and contrast expansion, further enhancement of the character-images can be performed. In various embodiments these enhancements can include but not limited to static edge enhancement, dynamic edge enhancement (eg alternating-brightness or alternating-colour edges), colour remapping, sharpening filters, etc. Where OCR is not applied, the zoom function in step 1011 is an image-zoom, either optical or digital.

Figure 11A:
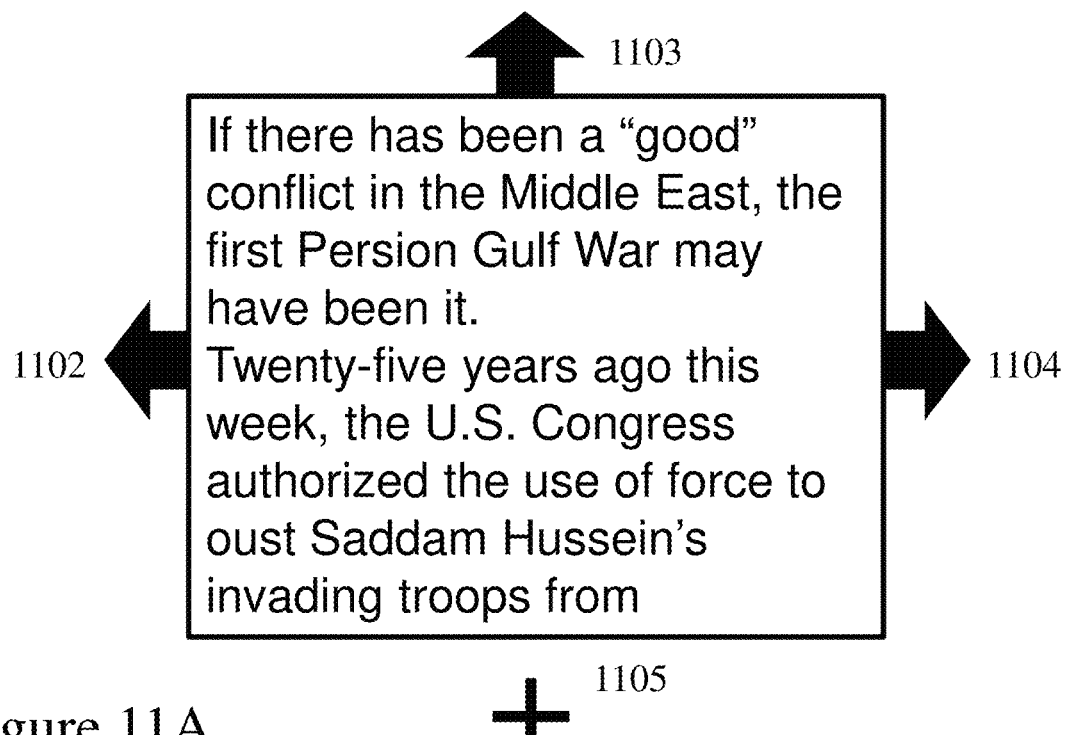
FIGS. 11A and 11B depict displayed text enhancement and navigation features used for control of text enhancement displaying the beginning of the first column and within the first column of the newspaper article depicted in FIG. 9.

Referring to FIG. 11A there is illustrated the display in a user-preferred font and layout of character-recognized text from the first text box 904 from FIG. 9, at the beginning of the article (although the electronic text might come from any source in general). These user-preferences can be a combination of statically-configured (for example, a preferred serif-less font), selected in-use (for example font size), or automatically-determined, for example through a training or learning process. This view might be presented to the user at step 1009 after step 1008 of FIG. 10, for example, assuming the user selected the first column text box in step 1007 ("If there has been . . . " are the first words of the first column of the article). Various navigation icon features are shown within FIG. 11A including solid arrow navigation icons 1102, 1103, and 1104 provide an indication of displaying further OCR regenerated text from other text-boxes that were identified to the left, above, and to the right, respectively, of the currently-selected text-box. Navigation (1012, 1013) to other text-boxes can be performed by selecting one of the solid arrows, which will return the user to step 1007. The large "plus sign" icon 1105 provides an indication that further text from this text box exists, but has not yet been displayed, as further scrolling down is required. A manually-invoked scroll could be accomplished by selecting the plus-sign icon 1105 or through one or other methods as known in the prior art including automatic scrolling, manual scrolling, etc.

Figure 11B:

For example, FIG. 11B depicts the text displayed to the user after scrolling, where the navigation icon 1103 above has been replaced by a plus-sign 1113 which indicates additional text above and within this text-box whilst the other lower plus-sign 1115 indicates further text below. As before in respect of FIG. 11A arrow icons 1112 and 1114 denote additional text columns are present within the document, image, website etc. for display by navigating through the selection of one of these icons. It would be evident that other icons and/or hieroglyphs, text etc. may be employed to denote the navigations options around the region of text currently displayed.

Figure 12A:
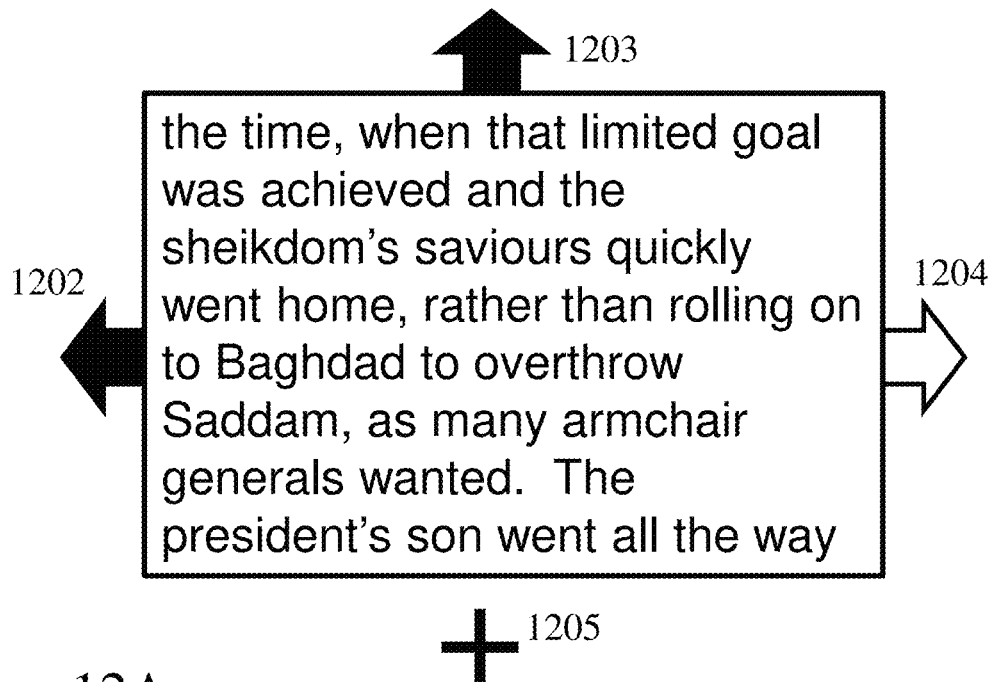
FIGS. 12A and 12B depict displayed text enhancement and navigation features used for control of text enhancement where the user has navigated to the beginning of the second column of text of the newspaper article of FIG. 9 and subsequently elects to apply further magnification respectively.

Referring to FIG. 12A there is depicted the NR2I display presenting text from the top of the second text box 905, where solid navigation icon 1104 has been altered from a solid arrow to an outlined arrow 1204, in order to indicate to the user that further text boxes exist to the right, but the system was unable to perform a complete OCR of the text box, in this case because of incomplete FOV image capture of text box 906 (see FIG. 9). Selecting the outlined-arrow icon 1204 in step 1012 will cause not navigation to the adjacent text-box, but rather "popping up" out of the regenerated-text display mode to FOV image capture, for example back to step 1004. Alternately, a more intelligent system might have been continuing to perform image capture, processing, and text-detection in the background, so that the adjacent column was available by the time the user required it. Such a background process might leverage camera movement to expand its captured FOV while the user is otherwise occupied.

Figure 12B:
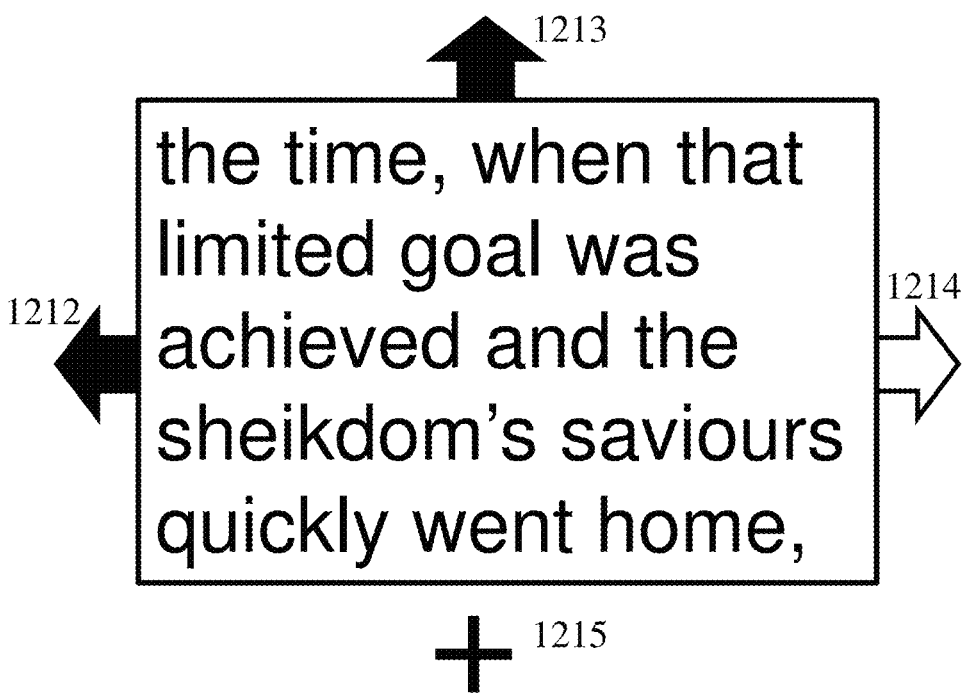

FIG. 12B illustrates the effect of steps 1010 and 1011 applied when the user is viewing the top of the second column of text 905 as in FIG. 12A. When the system's zoom function is invoked, because the system is in a text-processing state, instead of applying optical or digital image zoom as would occur if invoked while in any of steps 1001 through 1005, the text is instead rendered in a larger font size, and the text re-kerned, formatted, spaced and re-paginated within the text box display boundaries according to user preferences. Navigation features remain the same as in FIG. 12A, as the user is viewing the same region of text from the captured image as in FIG. 12A.

Note that the text rendered in the larger font in FIG. 12B begins with the same word as in FIG. 12A, and those words after "home" which no longer fit within the display window have been scrolled-forward, the user having to scroll down to have them be re-displayed. This technique of using the same text start index under font-size change within a text display-window is non-disruptive to the reading task if the user is currently reading at the top-left, but highly disruptive if employed when the user is reading at other locations. Text rendering and pagination software is built to start at the beginning and render from there.

Figure 13A:
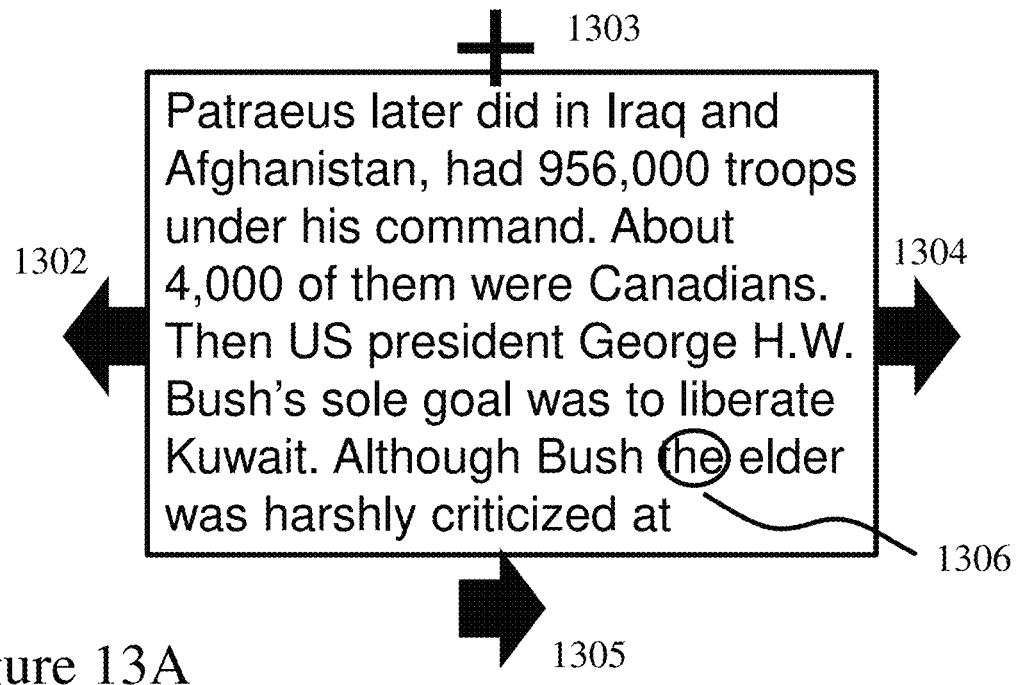
FIGS. 13A and 13B depict displayed text enhancement and navigation features used for control of text enhancement where the user has navigated within the newspaper article of FIG. 9 and subsequently elects to apply further magnification respectively wherein the display area is narrower than the text column to be displayed.

Now referring to FIG. 13A there is illustrated text display at the bottom of the first text box 904. Solid-arrow navigation icons 1302, 1304 indicate the system is ready to navigate to further text boxes to the left and right, respectively. As the user has reached the bottom of the text box, the plus sign navigation icon at the bottom has been replaced by a right-facing solid arrow 1305, to indicate that there is more text to view, but that navigation from the current text-box 904 to the text-box to the right 905 is required. Alternately, the system might recognize that the text at the bottom of text-box 904 in fact continues in the text-box to the right 905, and perform this navigation to the new text-box 905 automatically upon scrolling-down, changing navigation icons as needed.

It would be evident to one skilled in the art that the specific icons used in these examples, and their associated semantic meanings could be altered yet remain within the scope of the current invention.

It might be the case that the user is currently reading the text at the location shown by the user's PRL 1306 near the words "the elder" when the user desires a larger font. If the system naively re-displays the text in the larger font beginning with the word "Patraeus" the user's reading task would be highly disrupted, as the text they were reading will be scrolled-forward off the display after zooming (here we equate "zoom in" with a font-size increase, and "zoom out" with a font-size decrease).

Figure 13B:
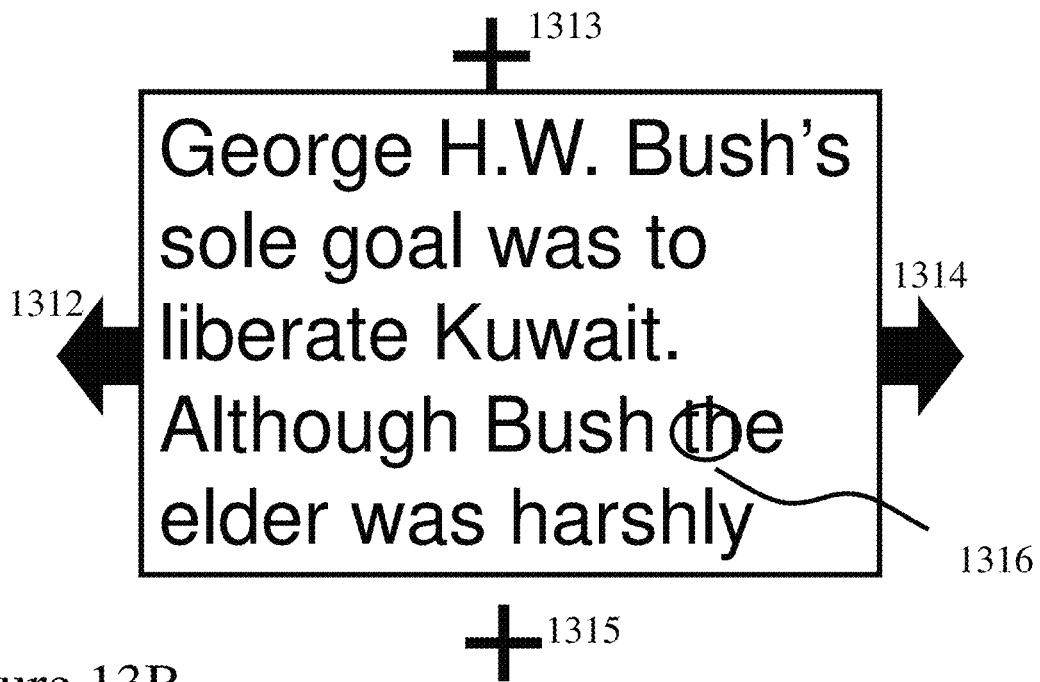

Accordingly, referring to FIG. 13B there is depicted a reading-location and font-size-change adaptive zoom that reduces disruption to the user. The objective is to make reading location largely invariant under font-size zoom so that the user can read continuously whilst making a desired change to the manner in which the text is displayed. When a font-size zoom is desired, first the user's current reading (and thus alignment-target) location is stored (for example, via gaze tracking). Both the display X-Y coordinate location and the currently-read word location within the text are noted. In the example shown the word "the" is identified.

One method of ensuring that the text remains "centred" at the user's current reading area is to:
  Find the line, at the new font size and line spacing, that most closely matches the user's Y-axis reading location before zoom;
  Place the currently-read word on that line, at or near the last X-axis reading location;
  Perform a virtual rendering and pagination process backwards from that word and location to find the word that should appear first, at the top-left of the display, and set the text start-index to that word;
  Perform text rendering and forward-pagination from the new start-index location with the new font size and refine the start-index word within the text to achieve best alignment, if necessary; and
  Render the text at the new font size from the new start-index word and finally send the image to the display.

A decision metric such as an L2 norm between initial and final target-word locations might be used amongst different potential start-index locations to refine selection. An alternate and simpler means is to perform a simple backwards average-character-space count from the target-word to the start-of-display at the new font-size and line spacing, then count back the same number of characters in the text, and begin searching for suitable first-words-to-display from there. While the reading-alignment process is described in terms of a font-size change or zoom, similar methods apply to other readability-enhancement means, such as expanding line spacing, character spacing, font aspect ratio, or interword spacing, for example. In the font-expansion example of FIGS. 13A and 13B, the method selects "George", re-renders the text in the larger font, leaving the word "the" in largely the same location 1316 within the displayed image. The navigation symbol 1315 has been changed to indicate that there is now further text in this text-box, that which was scrolled-forward during the font-change.

Figure 14:
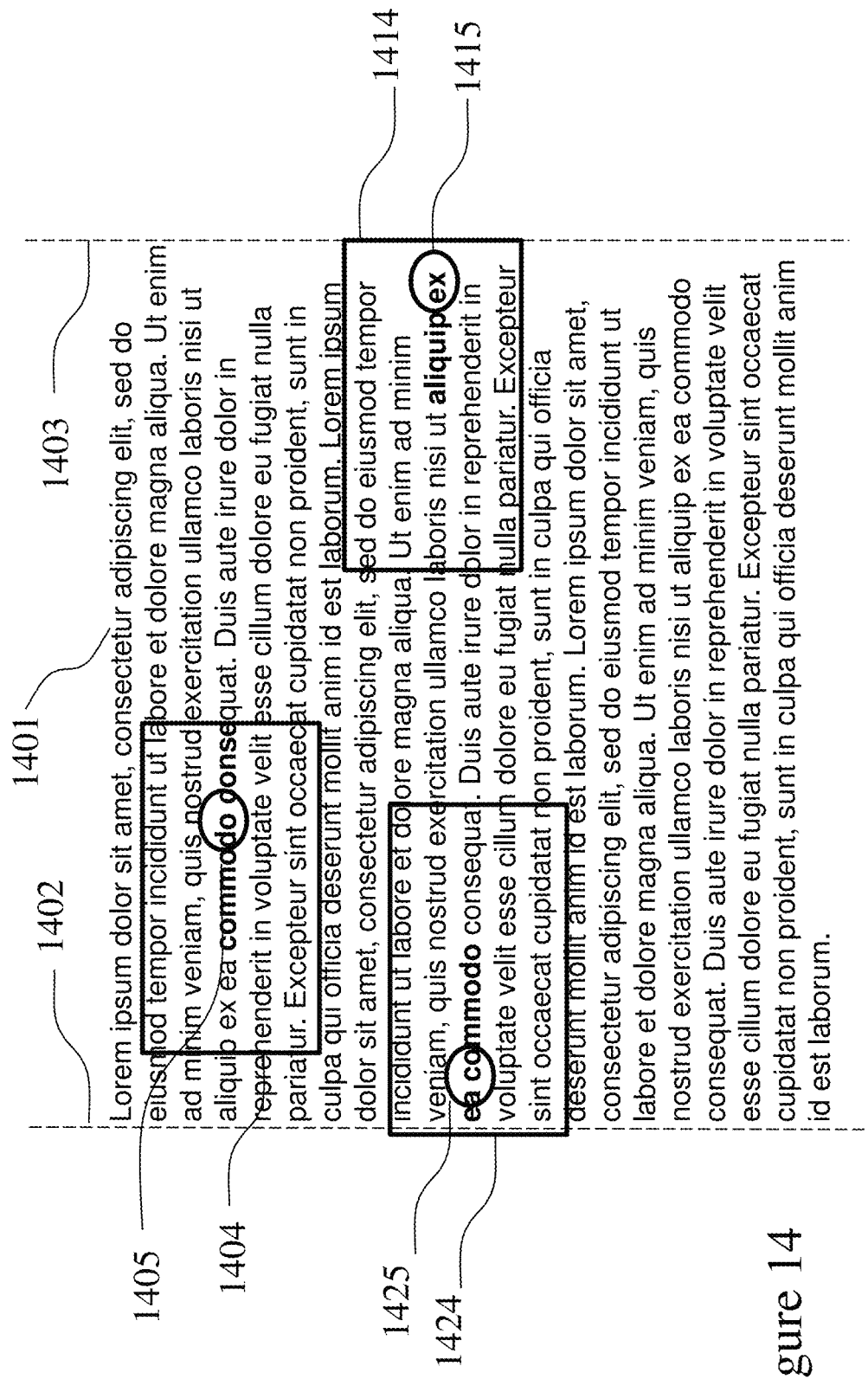
FIG. 14 illustrates navigation of a block of text presented to a user via an embodiment of the invention wherein the display area is panned over the text.

Now referring to FIG. 14 there is depicted navigation within a block of text 1401 where the display area (shown at three points in the user's navigation of the text as blocks 1404, 1414, 1424 respectively) is panned over text 1401. The text has been paginated within left and right margins 1402 and 1403, respectively for display. One means of conveniently navigating through the text can be provided by gaze and/or inertial tracking, although more conventional pointer- and scroll-wheel-based navigation may be employed as may other methods exploiting other haptic interfaces, gestures, vocal commands etc. Whilst the user is reading the camera may be capturing their gestures and interpreting standard gestures as navigation commands before returning to image capture for text processing when the user reaches a predetermined location within the currently processed text or indicates to move to a new location/region of the item being read such as the newspaper, website, book, spreadsheet, etc. Visual feedback in the form of a translucent "X", circle, text highlighting, or other means can be provided so the user can guide the system via any of a variety of input means if a specific embodiment lacks gaze-tracking. Where "PRL" is used below to represent the user's current reading location, in some embodiments of the invention this may be inferred from other input devices.

When the user is viewing the display in position 1404 in the central region of a large area of text, an example of the user's direction of gaze or preferred retinal locus PRL 1405 is shown. Also shown is that the text at or near the PRL location is highlighted. The system may monitor the user's PRL in relation to the display area to perform navigation of the display-window. As the PRL 1405 shifts to the right, the display area may be shifted rightwards to display further text. If the user's PRL 1405 begins to drift or dwell to the left with respect to the display area, the rate of horizontal scrolling can be slowed, or the display area shifted left to allow re-reading of text. As the user's PRL dwells near the right of the display, horizontal scrolling can be accelerated, provided the right-hand margin 1403 has not yet been reached. As the display region 1404 approaches the right-hand margin 1403 the rate of horizontal scrolling can be reduced smoothly to avoid visual disruption. In this manner the system according to embodiments of the invention is automatically adaptive to the user's speed of reading.

When the right-hand margin 1403 is reached by the right-hand side of the display region 1414, the system must wait until the user has parsed and read the last word of the line, in this case the word "ex". Return of the display-region 1414 to the left margin location 1424 and vertical line scrolling are initiated as quickly as possible for maximum reading speed. As soon as the users PRL is no longer dwelling at the right of display, but the user has begun to hunt leftwards for the start of the next line, the display area is jumped, or rapidly shifted left (as opposed to slowly scanned right while the user is reading a line of text) to the left margin, and advanced to the next line. The next line is highlighted (here shown in bold, though other means, e.g. preferential colouring are not excluded) to provide an obvious target for the user to hit with their PRL 1425 so that they may begin reading the next line. Note that the PRL might be inferred from input and sensors other than gaze-tracking, for example through use of pointing devices and inertial sensing.

In text-to-speech synthesis applications with concurrent text display, the word currently being machine-read might be highlighted, for example emboldened as shown in FIG. 14. If the user's PRL is falling behind (to the left) of the synthesis, the rate can be slowed. If the user's PRL is advancing ahead of synthesis, the rate can be increased. Inertial sensing can also be used in place of eye-tracked PRL.

Figure 15:
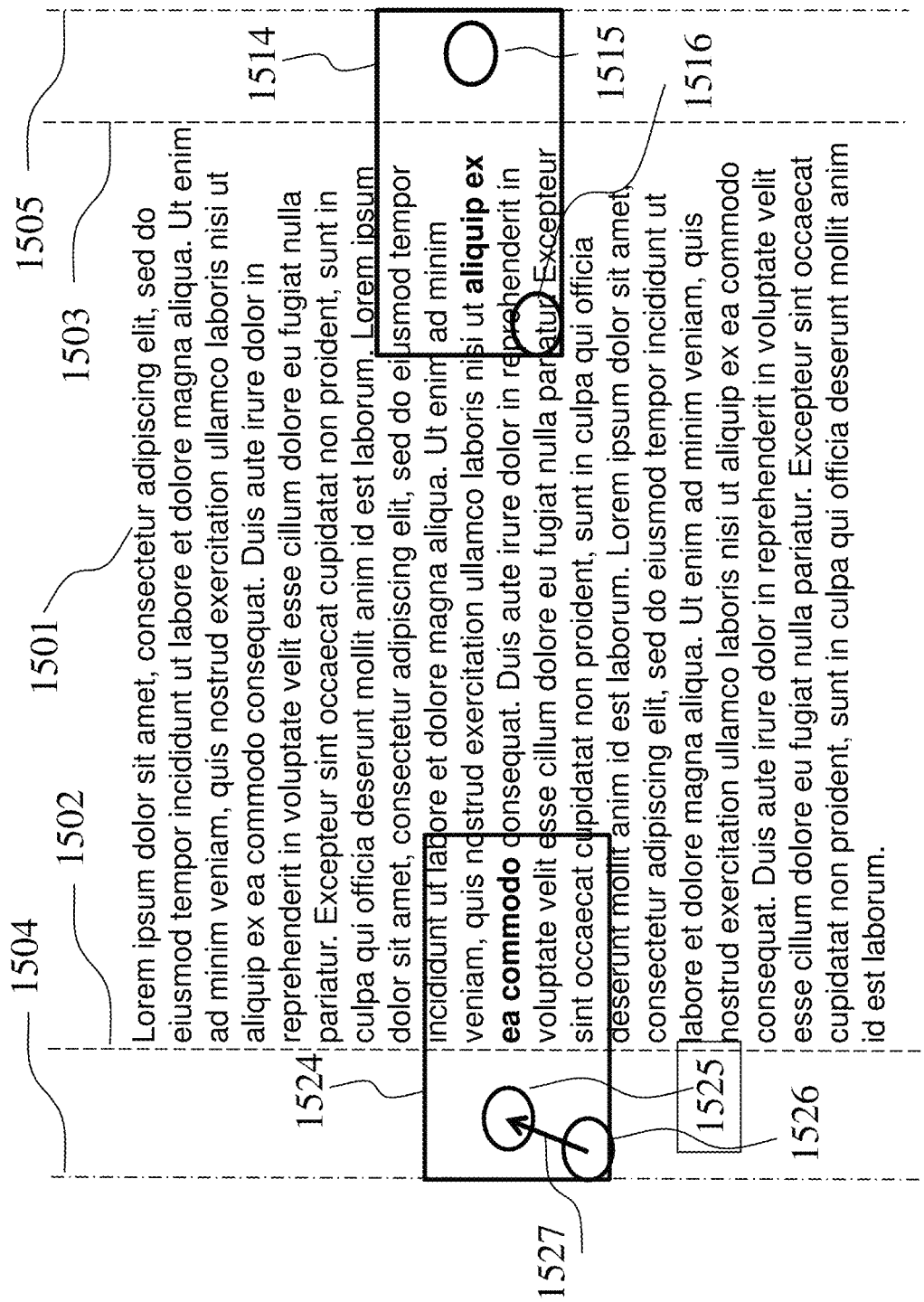
FIG. 15 illustrates the same block of text presented to a user via an embodiment of the invention wherein the pagination margins are expanded to support off-axis viewing.

Now referring to FIG. 15 the same block of text as in FIG. 14 is illustrated together with left and right pagination margins 1502, 1503 respectively together with additional expanded margins 1504, 1505. These additional margins being provided for the purpose of off-axis viewing by some users. In users with, for example, scotoma upon their retinas, the user's PRL may not be aligned with the normal visual axis of their eye. The normal axis places the PRL centrally at the location of the fovea which is damaged with scotoma. In such cases the user may have learnt to "eccentrically view" wherein their gaze direction is offset such that what they wish to see if projected away from the scotoma and hence visible to them. Accordingly, it is convenient to provide spatial offsets, both for the purpose of determining the user's actual PRL, which differs from the direction of gaze typically detected through gaze-tracking, and to provide expanded viewing areas for the user, so that they may correctly perceive the start and end of lines of text.

For example, a user's direction of gaze as determined through eye-tracking might indicate that a user is focusing upon the bottom-left corner of the display 1526, yet, because of a scotoma or other visual degradation, the user's actual PRL is located above and to the right at location 1525, and since this is the region preferred by the user for the reading task, should be used for gaze-based navigation instead of the normal PRL which is aligned to the direction of gaze. The system may include an offset 1527 between gaze direction and PRL to accommodate this in the navigation methods. Further, because such users typically have "blind spots" near their offset PRLs, it is helpful to provide additional blank virtual display area so that the user might ensure there is no text beyond the start and end of lines. Thus the system may alter the navigation so that a user's offset PRL 1515 extend all the way to the extended virtual right-hand margin 1505 before allowing triggering of the next-line display-area-return and line advance.

For some users, it may be most convenient to keep their gaze centered at a particular area of the display, for instance the bottom-left 1516, 1526, and not to shift their gaze during the reading task. In such cases a fixed offset between gaze direction and PRL is inadequate, and the region of interest, here, the characters that the user is attempting to interpret, may be inferred through other means, for example by indicating a current reading location to the user through highlighting, overlaid icons, etc. and then allowing them control of the location of this indication using techniques other than gaze-tracking, for example using head motion, or the use of pointing mechanisms.

Optionally, during an assessment of the user's vision by an ophthalmic physician or within a set up procedure for the NR2I system, the eccentric viewing may be characterised and pre-configured/configured by the NR2I system. For example, providing a series of objects within the FOV and tracking eye movement or tracking their movement of an object following a trajectory may be employed for this.

Figure 16A:
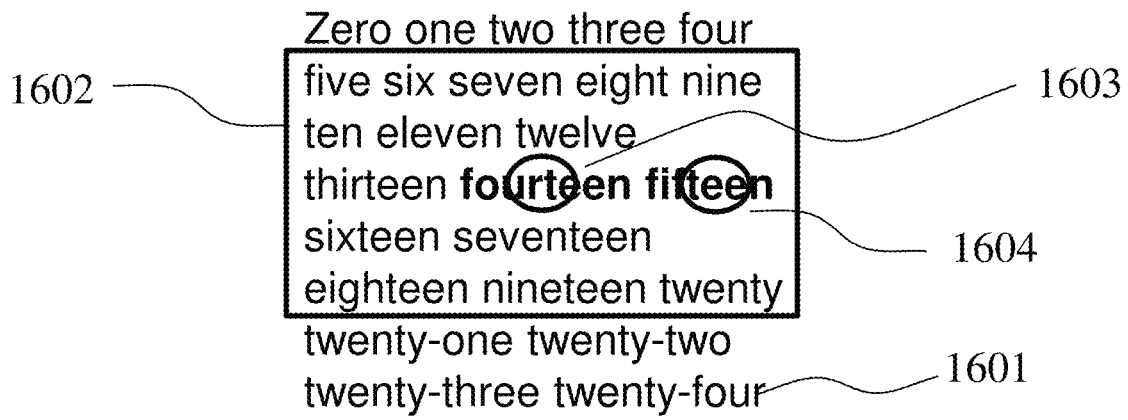
FIGS. 16A through 16C depict text display methods according to embodiments of the invention before vertical scrolling, after vertical scrolling, and with horizontal text scrolling respectively.
Figure 16B:
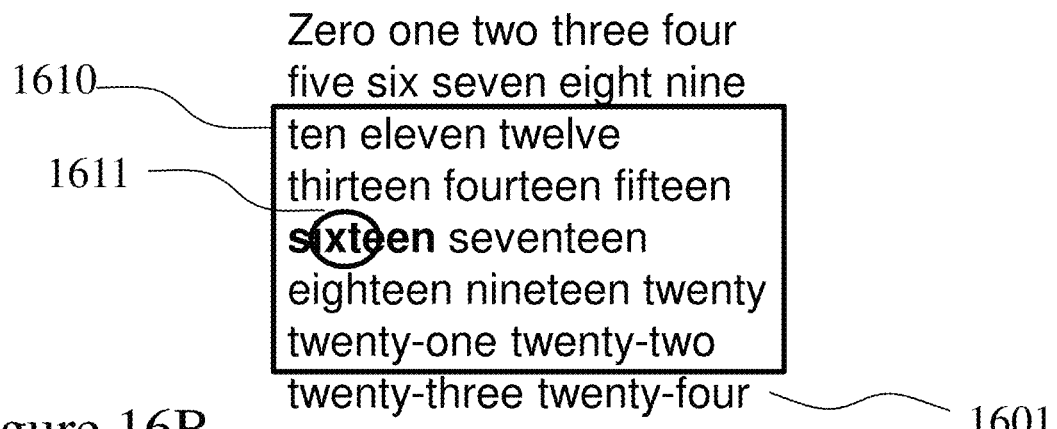

FIG. 16A depicts a text display area 1602 within a block of text 1601 where either discrete line-based, as described above, or continuous scrolling might be performed. In the case of line-based scrolling, as the user's PRL or gaze 1603 moves to the right 1604 and begins its return to the left 1611, the line can be advanced, and the first word of the next line highlighted as shown in FIG. 16B to aid/ase navigation for the user within the displayed content. In the case of continuous scrolling, the vertical location of the user's gaze or PRL within the display window can be used to control scrolling-speed. If the user's gaze drifts upwards and dwells there, it provides an indication that the user is falling behind the average scroll-rate; if the user's gaze or PRL drifts downwards and dwells there, it provides an indication that the user is advancing faster than the average scroll rate. In both cases the scroll-rate may be automatically adjusted so that the user's gaze or PRL re-locates towards the vertical centre of the display area. Because the user is not typically parsing text when the gaze is in the process of returning towards the left margin, this provides an opportunity to scroll the text upwards at an accelerated rate, as compared to when the gaze is moving from left to right, and a stable display is desired. This last method is thus a hybrid between continuous and line-based scrolling.

It would be evident that the embodiments of the invention have been described and depicted within the Figures through the use of English text which is read in a left-right, top-down sequence. However, it would be evident that other languages and/or personal preferences may not be such. Accordingly, the system may provide for the user to read right to left, then top-bottom, or top to bottom then left-right, or top-bottom then right-left, or other, that designations such as "left", "right", "above", "below", "vertical", "horizontal", alternate directions of navigation and associated icons, might be substituted in these descriptions yet still be within the scope of invention. Such a determination of reading "format" may be based, for example, upon user preferences or selection of the language for displaying OCR'd and modified content. System parameters and preferences can be automatically and dynamically altered in response to the specific type of text.

Figure 16C:
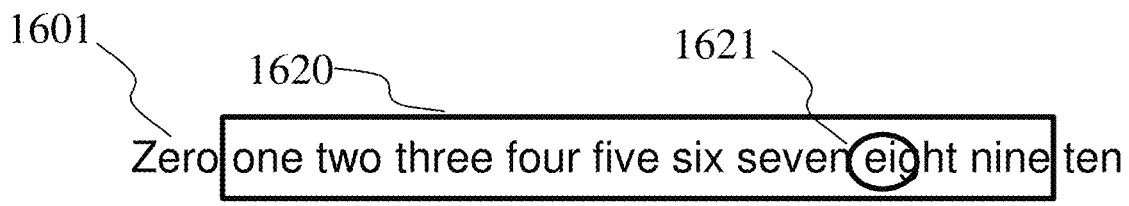

FIG. 16C illustrates a horizontal display of single-line text 1601, commonly referred to as a "ticker tape display" where the text is scrolled right to left in the display window 1620 without any other lines being displayed. Analogous to above, the user's gaze or PRL location may be used to provide feedback to the system on suitable scrolling rates and dynamic adjustments to scrolling rate.

Within other embodiments of the invention the system may exploit different font types, sizes, kerning, colouring, display formatting etc. in combination with observing the horizontal location of the PRL or gaze 1621 for each display variation and scroll-speed during the reading task to provide an "optimization" of the display parameters. The optimization may be different according to the context of the user such that rapid recognition in some circumstances of a single word or limited number of characters may exploit different settings to that for reading an article, book, newspaper, etc. Accordingly, the NR2I system or other systems exploiting embodiments of the invention may tune the display format etc. to improve reading speed or comprehension. Within some embodiments of the invention the system may periodically repeat such assessments or may distribute them over a period of time to ensure continued "optimization" and potentially train the user to faster reading, viewing increased text quantities within their field of view etc.

Given a fixed-size display area, it should be clear that the number of displayed characters, and thus the available context for user parsing of text, decreases as the font size increases. In the limit, only a single character might be visible, and the reading rate be thus very low. At the other extreme, using very small fonts, more text and thus context can be displayed which can help in the reading task, but the user might spend significantly longer on each word or character before recognition, again slowing reading speed. Between these two extremes a preferred font size might exist that would optimize the user's reading speed or comprehension. Similar effects exist for kerning (character spacing) line-spacing: often white-space can improve intelligibility of text, but as one adds white-space, the amount of displayed text in a fixed area must necessarily decrease, again reducing displayed content and context.

Figure 17A:
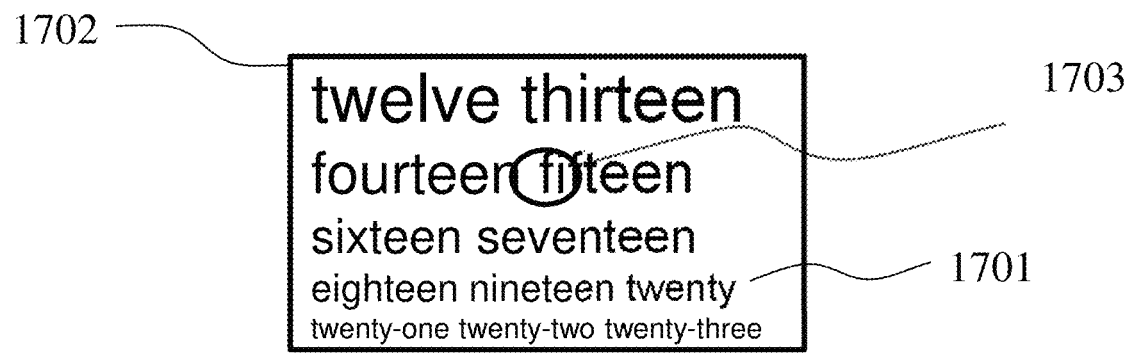
FIGS. 17A and 17B depict variable font size selection options according to an embodiment of the invention for a user exploiting vertical and horizontal scrolling windows respectively.

This concept is further illustrated in FIG. 17A, which depicts text 1701 displayed in a display area 1702 using variable font sizes. Typical eye-charts are static, and rely upon user recognition of decreasing font-size characters to find the limit of recognition for users. In contrast, FIG. 17A which represents a dynamic and scrolling "eye-chart" so to speak. The variable font-size may be displayed as shown in FIG. 17A, in which a large font size decreases at each line break, and text re-rendered as it scrolls upwards, or all text in the display area may be presented at a single font-size that is then decreased through time as the text is scrolled by. By monitoring vertical location of the user's gaze or PRL, the system may observe whether the user is reading faster or slower than the current scrolling rate. The system may alter any of its display parameters (size, colour, spacing, etc.) while measuring the text reading-rate, and thus allow the user to tune the system to a preferred text-display configuration.

Figure 17B:
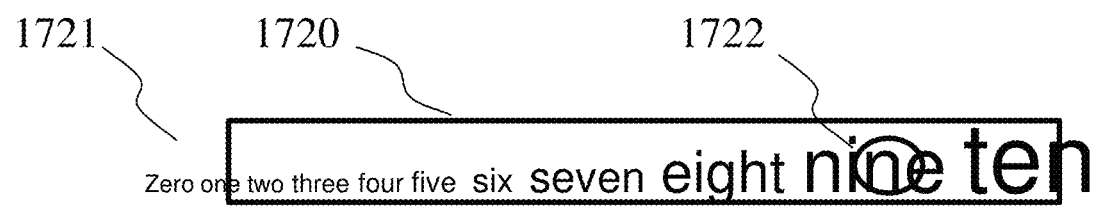

FIG. 17B illustrates the varying font-size tuning approach in a horizontal scrolling window 1720, as opposed to a vertical scrolling window, though otherwise the methods are similar. Text 1721 might either all be rendered at the same font size within the window, and change over time during parameter-tuning, or the text might be dynamically re-rendered during scrolling as shown. In both cases the PRL or gaze is monitored to accelerate or decelerate scrolling speed as needed. By varying display parameters as above, and the horizontal scrolling speeds in response to user indications whether PRL-, gaze-based, or other, e.g. head motion, a preferred combination of font, font size, kerning, line-spacing, colouring, brightness, contrast, etc. can be found and configured as user defaults. The tuning and configuration process might be undertaken in a horizontal scrolling window, yet applied to another mode of display, or vice-versa.

Where a user reads multiple types of text, or text in different languages, the user and/or system may perform tuning and/or configuration of display and reading parameters separately for each, stored by the system. Upon detection or configuration of the language or type of text being displayed, the system may automatically re-configure some or all of these parameters as appropriate or as directed by the user.

In some cases, a word may be unintelligible to the user for some reason. By dwelling their gaze or PRL on a particular word, the system may automatically provide text-to-speech synthesis of the word, or provide a definition or synonym in either text or audible form.

FIG. 18 depicts an embodiment of the invention in which a free-form prism based display system 1801 with microdisplay 1810 projecting light onto a first surface of a free-form prism which after performing two internal reflections is viewed by the user through a second surface. The third surface of the prism facing forward may also receive light from the forward field of view in some configurations, i.e. transmissive systems. In such systems a second corrective prism 1850 may be employed proximate the third surface, and the two surfaces of the prisms may mate. The second transmissive element 1850 being required to correct for chromatic and spatial aberrations induced in the transmissive path through the free-from prism 1820. A selectively-transmissive shutter element 1860 of, for instance, thin-film, polymer, semiconductor or liquid-crystal construction capable of spatially selectively altering the opacity of the transmission path to the forward field of view is also shown. Such an element is capable of rendering opaque, partially opaque, or transparent addressable regions within the display area allowing a NR2I system with such a selectively transmissive shutter 1860 to offer both transmissive and immersive viewing options or selectively block portions of the FOV within which the microdisplay 1810 presents content.

Figure 19:
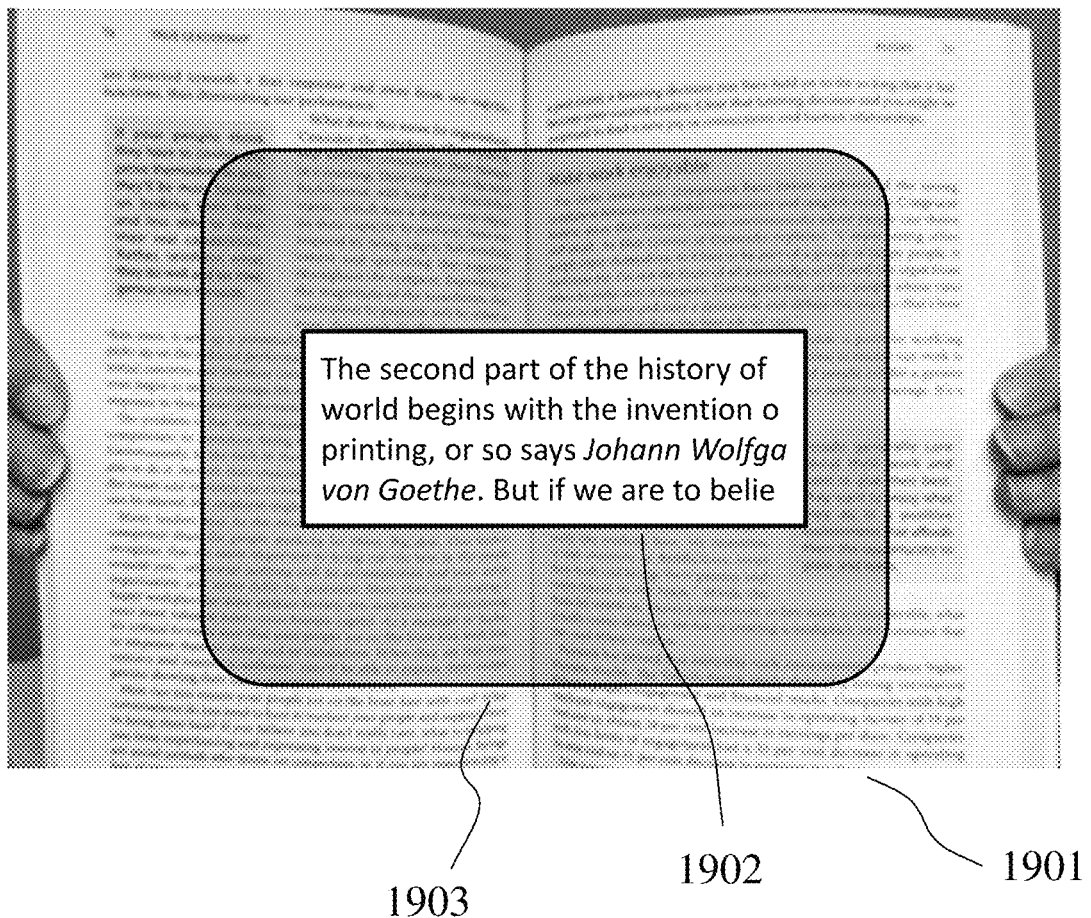
FIG. 19 depicts an example of text overlay within a window within the user's field of view according to an embodiment of the invention exploiting a NR2I system as depicted in FIG. 18.

Referring to FIG. 19 there is depicted image capture and display by a system according to that depicted in FIG. 18. As depicted an image of text within a book 1901 is shown captured, enhanced, then re-displayed 1902 in a region 1903 that has been made semi-transparent by the addressable shutter. Only the enhanced text display 1902 is synthesized through electro-optics, the light arriving to the eye from other portions of the image area being transmissively received from the environment.

In another embodiment the text regions are dynamically specified by meta-data associated with the image-data, for example using mark-up language tags (HTML, XML . . . ), or picture-in-picture control streams. For example, as depicted in FIG. 9 an image is received, its meta-data extracted, image regions defined and processed. Within another embodiment of the invention the text has been extracted/identified prior to broadcast/transmission of the image and is embedded into the meta-data together with the coordinates.

In another embodiment the region of text to be enhanced may be user-specified through manual input, for instance through a mouse, touch-pad, or other pointing device, or through automated user-input, for example using pupil-tracking or inertial sensing. Accordingly, once selected the region of text may be subjected to one or more processes including, but not limited to the following.

Text image enhancement;

Zooming and cropping of text within a text region;

Static edge enhancement of characters, e.g. contrast, sharpness, colour-mapping, cartooning, etc.;

Dynamic edge enhancement on characters. Application of a time-varying effect on whole characters and/or the edges of characters, for example a blinking outline around a character image.

Character Recognition based re-kerning, font translation. In this embodiment the text-region image-data is analyzed to determine the text characters being displayed to allow text-image replacement with a more legible image synthesized by the display device or alternatively the text converted using Character Recognition (CR) is translated prior to formatting for display and/or provided to the user audibly. CR may be performed locally and/or remotely. Some embodiments of the invention may exploit CR discretely or in combination with Word Recognition (WR). Optionally WR may be exploited without CR.

Automatic text image stabilization and horizontal/vertical navigation and panning in NR2I text display through horizontal/vertical registration. Accordingly, based upon processing of input data such as gaze-tracking, eye-tracking, NR2I inertial/translation/rotation sensors the images may be processed to lock image to lines of text, words on a line, or the margins of text regions, for example such that user motions arising from physiological conditions such as saccades, Parkinson's disease, tremors etc. do not adversely affect the displayed images. The image may then be subsequently panned under user control. The panning control means may be a time function (characters, words, lines, beats, or bars per sec . . . ) or through a pointing device, pupil-tracking, inertial-sensing, vocal command, touch screen motion such that a user may for example pan across a display, for example within a museum providing background to an artifact, origin, etc. wherein the image is captured and the user pans through the touchscreen of their PED in their hand.

Within embodiments of the invention various procedures and processes have been described with respect to establishing enhancements to the display of text and other character based content which improve the readability and/or comprehension of the character based content by the user. It would be evident that a user may prefer different enhancements in different circumstances, contexts. For example, the user may prefer text to be displayed within a white background within the FOV image when out and about but prefer audio rendering when at home. Accordingly, the enhancements applied to regions of character based content may be contextually defined.

Within an embodiment of the invention the display only provides text based information that the user desires to read, which may for example, be established contextually or through information acquired based upon one or more factors such as location, time, processed image, ROI, FOV etc. For example, a user walking down a street of shops may only be provided with the names of the shops unless they turn their head towards a particular shop. Optionally, content may be derived from a single source of image-data containing the text to be read.

In another embodiment of the invention a user may desire to view both text-images and other image data from other sources, for example a musician desiring an image-enhanced view of his score whilst also being able to view the conductor, or a student wanting a clearer view of both her text on the desk and her teacher, or someone wishing to read an e-book or PDF file while also maintaining some visual awareness of their surroundings. In this embodiment a composite image is created from the multiple image sources, the enhanced text-image being presented in one area of the display and the other image source(s) in other display region(s). The relative sizes and locations of displayed text and other image data may be dynamically altered based on either direct or implicit user input. In the example above the size of the conductor's image might be shrunk and the music-text image expanded as head or gaze is directed downwards towards the score, and the opposite as the user looks upwards to see the conductor.

In embodiments with multiple image sources a means is provided to differentially select the amount and location of display of the multiple images. In one such embodiment the means is achieved using inertial sensing—as the user moves their head the sensor pans the composite image. In another such embodiment the user's eye is pupil-tracked and the image-source being focussed upon is preferentially displayed in terms of size or location. In another such embodiment the composite display is controlled by a pointing device such as a mouse or touch-pad. In one multiple-image embodiment one or more image sources are overlaid within the composite image, as is common in picture-in-picture displays. Such overlay may be opaque or translucent. In another such embodiment the multiple image sources are tiled and panned-amongst within the composite image.

Embodiments of the invention may apply the method described and depicted to a selected region of interest, multiple selected regions of interest, one or more determined regions based upon processing of image content or automatic processing of all text identified within an image wherein all or predetermined portions of the text and/or text within one or more determined and/or selected regions of the image are then displayed to the user.

Optionally, embodiments of the invention provide a user with automatic panning of text such as a ribbon of text, so called "ticker-tape" format of text, identified within an image wherein all or predetermined portions of the text and/or text within one or more determined and/or selected regions of the image are then displayed to the user.

Optionally, the methods described supra in respect of embodiments of the invention may be augmented with other depth mapping methods according to embodiments of the invention including but not limited to, infrared depth mapping wherein an infrared (IR) grid may be projected from an infrared emitter within the NR2I and acquired with an IR camera. The resulting IR grid is then employed to establish depth. Such IR techniques may be limited to environments where the user is viewing items that are close or may be triggered based upon the user's head position, location information, etc. Optionally, a pair of cameras within the NR2I may be deployed and the images processed to derive parallax based depth information similar to the user's human vision system. Optionally, phase detection as implemented within some CCD based sensor devices may be employed. However, embodiments of the invention may process the image data and extract text information for image data that is associated with a certain depth range which may be contextually derived. Accordingly, the process of acquiring content and processing the acquired content to identify text and/or regions of text may exploit derived depth information to filter before and/or after processing the identified text and/or regions of text to include or exclude them.

Optionally, the user's location in combination with image processing of the image acquired may be employed to derive a depth map or an initial estimate of a depth map to define a range such as employed in defining a range of camera focusing and accordingly portions of a field of view within which text should be processed.

Optionally, embodiments of the invention may include object recognition to associate elements within the image to objects and highlighting the identified objects based upon their depth (distance) or a meaning associated with the object.

Optionally, embodiments of the invention may include moving the location of an object identified within the acquired image data within the resulting image provided to the user.

Optionally, embodiments of the invention may include establishing content within the image having a depth below a predetermined threshold or above a predetermined threshold.

Optionally, content identified with the image and/or having a depth meeting a predetermined criterion or criteria may be modified wherein the modification may be one or more of:

applying a predetermined image processing algorithm to the predetermined portion;

applying a predetermined spectral adjustment to the predetermined portion;

applying a predetermined temporal adjustment to the predetermined portion;

applying a predetermined spatial adjustment to the predetermined portion;

applying a blurring process to the predetermined portion; and replacing the predetermined portion with a correlated predetermined portion of another image acquired with a different depth of focus.

Optionally, the system may provide an output to the user in dependence upon processing an acquired image in conjunction with a depth map where the output is not visually presented to the user by modifying the image. Rather the output is one or more of a tactile output, a visual output, and an audible output. The output or an aspect of the output may be established in dependence upon a depth of content within the processed image associated with triggering the output.

Embodiments of the invention have been presented supra in respect of text and English. However, "text" as used herein and through this disclosure refers to, but is not limited to, any object that can be "read," whether this object is a work of literature, a street sign, an electronic message. It is a coherent set of signs/symbols that transmit some kind of informative message. This set of symbols is considered in terms of the informative message's content, rather than in terms of its physical form or the medium in which it is represented and hence may include, for example one or more alphabets including, for example, Latin, Greek, Arabic, Hebrew, Cyrillic, Kana, and Hanzi. It may also include any character notations from any human-readable language, including the languages and character sets of science, technology, mathematics, and music. Accordingly, embodiments of the invention may be applied to any character based content.

According to embodiments of the invention the NR2I may use hardware components including image sensors, lenses, prisms and other optical components, and video displays, that mimic the inherent performance of human vision in terms of visual and cognitive spatial acuity, visual and cognitive spectral response or sensitivity to colour and contrast, and visual and cognitive temporal response or sensitivity to difference in visual information from one moment in time to the next. Examples of this biomimicry could include components that have higher resolution and better colour representation in the center of the field of view or preferred retinal location, and relaxed resolution and colour representation, but faster refresh performance at the extremities of the field of view, thereby mimicking the natural performance characteristics of human vision.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one or more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for providing improved legibility of text within an image to a user comprising:
   a memory and microprocessor in communication with the memory, the memory storing computer executable instructions which when executed by the microprocessor configure the microprocessor to execute a process comprising:
      acquiring an original image;
      processing the original image to establish a region of a plurality of regions, each region having a probability of character based content exceeding a threshold probability;
      processing the region of the plurality of regions to extract character-based content; and
      processing the extracted character based content to generate a modified region; and
      displaying the modified region in combination with the original image upon a display.

2. The system according to claim 1, wherein
   the process further comprises the step of determining whether the region of the plurality of regions is relevant to the user after processing the region to extract character-based content; and
   the modified region is displayed in combination with the original image when the determination is positive.

3. The system according to claim 1, wherein the processing applied to the extracted character based content to generate the modified region is established in dependence upon an aspect of the user of the system.

4. The system according to claim 1, wherein displaying the modified region in combination with the original image comprises one of:
   scrolling a window comprising the modified region in combination with the original image and highlighting the modified region;
   re-paginating the original image content in dependence upon an offset, the offset established in dependence upon a measure of off-axis viewing of the user; and
   scanning or scrolling a window comprising the modified region in combination with the original image, highlighting the modified region, and adjusting the scanning or scrolling in dependence upon an offset, the offset established in dependence upon a measure of off-axis viewing of the user.

5. The system according to claim 1, wherein displaying the modified region in combination with the original image comprises at least one of:
   employing a hybrid continuous and line-based scrolling method; and
   establishing a direction for scrolling in dependence upon a language, the language determined in dependence upon optical character recognition based processed of the extracted character based content.

6. The system according to claim 1, wherein displaying the modified region in combination with the original image comprises at least one of:
   scrolling at least one of the modified region and the original image and a font size employed in rendering extracted character based content is dynamically adjusted in dependence upon a gaze direction of the user;
   varying a characteristic of generating the modified region and automatically establishing user feedback in dependence upon the user's reading action to define one or more limiting values for that characteristic for that user;
   dynamically re-rendering the modified region based upon a determined user reading rate of the extracted character based content.

7. The system according to claim 1, wherein
   the display is a head mounted display (HMD) worn by the user;
   the HMD is either transmissive or non-immersive.

8. The system according to claim 1, wherein
   the display is a head mounted display (HMD) worn by the user; and
   the HMD is immersive.

9. The system according to claim 1, wherein
   processing the original image to establish a region of a plurality of regions comprises processing the original image to extract data associated with the original image;
   the data defines the region of the plurality of regions; and
   the data is at least one of meta-data and a mark-up language tag.

10. The system according to claim 1, wherein
processing the original image to establish a region of a plurality of regions comprises processing the original image to extract data associated with the original image;
the data defines the region of the plurality of regions; and
the data is either:
dynamically specified by an external source from which the original image is acquired; or
derived from a picture-in-picture control stream associated with the original image.

11. The system according to claim 1, wherein displaying the modified region is performed by displaying the character based content within the modified region by at least one of scrolling the content horizontally and scrolling the content vertically across a field of view of the user.

12. A near-to-eye (NR2I) system providing improved legibility of text within an image to a user comprising:
a display; and
a memory and microprocessor in communication with the memory, the memory storing computer executable instructions which when executed by the microprocessor configure the microprocessor to execute a process comprising:
acquiring an original image;
processing the original image to establish a region of a plurality of regions, each region having a probability of character based content exceeding a threshold probability;
processing the region of the plurality of regions to extract character-based content;
determining whether the region of the plurality of regions is relevant to the user; and
upon a positive determination:
processing the extracted character based content in dependence upon an aspect of the user of the NR2I system to generate a modified region; and
displaying the modified region in combination with the original image upon the display.

13. The NR2I system according to claim 12, wherein determining whether the region of the plurality of regions is relevant to the user is established in dependence upon at least one of:
a visual dysfunction of the user;
a gaze direction of the user; and
a context of the user.

14. The NR2I system according to claim 12, wherein determining whether the region of the plurality of regions is relevant to the user is established in dependence upon the extracted character based content.

15. The NR2I system according to claim 12, wherein processing the extracted character based content employs a processing algorithm established in dependence upon at least one of:
content of the image;
a context of the user;
a preference of the user established by the user selecting the processing algorithm through a user interface of the NR2I system from a plurality of processing algorithms supported by the NR2I system;
an indication received from the user; and
a database comprising user feedback assessments of previous character based content extractions from images previously acquired.

16. The NR2I system according to claim 12, wherein the modified region is displayed in combination with the original image by at least one of:
displaying the modified region in a predetermined portion of a field of view (FOV) of the user other than the region of the image it originated from;
displaying the modified region in a predetermined portion of a region of interest (ROI) of the user other than the region of the image it originated from;
displaying the modified region in a predetermined portion of a FOV of the user other than the region of the image it originated from and highlighting where in the image it was extracted from.

17. The NR2I system according to claim 12, wherein at least one of:
the extracted character based content is presented to the user as one or more tactile signals;
determining whether the region of the plurality of regions is relevant to the user is established in dependence upon displaying indications relating to the plurality of regions to the user and receiving an indication from the user indicating the region of the plurality of regions as relevant; and
the processed extracted character based content is presented together with navigation indicators relating to the content associated with either an additional region of the plurality of regions or a further portion of the region of the plurality of regions allowing the user to navigate through the content.

18. The NR2I system according to claim 12, further comprising
processing the extracted character based text to determine salient content; and
processing only the salient content to generate the modified region.

19. The NR2I system according to claim 12, wherein the process further comprises at least one of:
a first sub-process comprising:
establishing content within the extracted character based content;
establishing additional information in dependence upon the established content; and
displaying the extracted character based content and the additional information to the user as the modified region; and
a second sub-process comprising:
establishing additional information with respect to the extracted character based content;
establishing additional content in dependence upon the additional information; and
displaying the extracted character based content and additional content to the user as the modified region.

20. The NR2I system according to claim 18, wherein the additional information is one of a location of the user, an orientation of the user, and a task being performed by the user.

21. The NR2I system according to claim 12, wherein determining a region of the plurality of regions as relevant to the user is established in dependence upon at least one of gaze tracking, a user vocal command, a haptic input received by the NR2I system from the user, a standard gesture made by the user captured with a camera forming part of the system having a field of view (FOV) aligned with the user's FOV.

* * * * *